US008139138B1

(12) United States Patent
Tapes et al.

(10) Patent No.: US 8,139,138 B1
(45) Date of Patent: Mar. 20, 2012

(54) SYSTEM AND METHOD FOR MEASURING ACCURACY OF FOCUS

(75) Inventors: Michael Tapes, Melbourne, FL (US); Paul Galburt, Punta Gorta, FL (US)

(73) Assignee: PictureFlow LLC, Melbourne, FL (US)

( * ) Notice: Subject to any disclaimer, the term of this patent is extended or adjusted under 35 U.S.C. 154(b) by 667 days.

(21) Appl. No.: 12/333,204

(22) Filed: Dec. 11, 2008

Related U.S. Application Data

(60) Provisional application No. 61/037,567, filed on Mar. 18, 2008.

(51) Int. Cl.
*G03B 13/00* (2006.01)
(52) U.S. Cl. ....................................................... 348/345
(58) Field of Classification Search .................. 348/345, 348/374, 180, 187
See application file for complete search history.

(56) References Cited

U.S. PATENT DOCUMENTS

2002/0131029 A1* 9/2002 Uchiyama ...................... 355/56

OTHER PUBLICATIONS www.canon-uk.com/Canon_Jan05/Canon_SLR_Focus_Tests.htm, Canon Digital SLR—Focus Test Procedure, accessed Oct. 7, 2007, 6 pages.
Jackson, Tim, http://FocusTestChart.com, Focus test chart, 2004, Version 2.1, 19 Pages.
www.dpreview.com/reviews/nikond70/page19.asp, Nikon D70 Review: 193 Lenses: Digital Photography Review, accessed Oct. 7, 2007, 4 pages.
http://leongoodman.tripod.com/d70focuspart3.html, My camera needs adjusting. Can i do it myself, accessed Oct. 7, 2007, 7 pages.

* cited by examiner

*Primary Examiner* — David Ometz
*Assistant Examiner* — Fayez Bhuiyan
(74) *Attorney, Agent, or Firm* — Thorpe North & Western LLP

(57) ABSTRACT

A reliable and repeatable accuracy of focus measurement device to measure the focus accuracy of cameras that employ a different light path between the lens and the focusing sensor and between the lens and the film or image sensor. The measurement device includes a frame having a substantially planar front face with a focusing target located thereon, and at least one depth-of-field ruler coupled to the frame with a transverse axis falling within a front face plane and a long axis that is angularly adjustable with respect to the front face plane.

27 Claims, 14 Drawing Sheets

SYSTEM AND METHOD FOR MEASURING ACCURACY OF FOCUS

RELATED APPLICATIONS

This application claims the benefit of U.S. Provisional Application Ser. No. 61/037,567, filed Mar. 18, 2008, and entitled, "System and Method for Measuring Accuracy of Focus," which is incorporated by reference in its entirety herein.

FIELD OF THE INVENTION

The present invention generally relates to the measurement of the focus accuracy of cameras, and more specifically to the accuracy of focus of single lens reflex ("SLR") or digital single lens reflex ("DSLR") camera systems.

BACKGROUND OF THE INVENTION AND RELATED ART

The accuracy of focus can be problematic for camera/lens systems which employ a different light path between image focusing and recording locations. For example, camera systems such as the single lens reflex ("SLR") or digital single lens reflex ("DSLR") cameras typically have three different light paths through which an image can be focused. With both type of cameras, the light path from the primary lens to the image recording device, such as photographic film, or a light sensitive solid state image sensor, differs from the path that light travels to reach the focusing sensor, which may be either an auto-focus system or a manual eyepiece.

As illustrated in the camera and lens system 10 of FIG. 1, when manually focusing the image the majority of the light from target object "O" passes through the primary lens 20 and reflects upward off the vertical focusing mirror 22 to impact the underside of the transparent matte view surface 24. This distance is referred to as light path OA. The top surface of the transparent matte is viewed through an eyepiece 26 by the photographer, who makes adjustments to the primary lens to bring the image on the matte into focus. It is critical that light path OA be substantially equal in length to light path OB, which is the distance that light travels before reaching the image recording device 30 after the mirror 22 pivots upward to take the picture. Otherwise, the light traveling along light path OB and impacting the image recording device 30 will be out-of-focus or focus-shifted. This problem can be present in cameras having film, a charge-coupled device ("CCD"), a CMOS detector, or similar sensor, etc. as the image recording device 30.

In auto-focusing cameras, a fraction of the light from target object "O" can also travel through a semi-transparent window 32 in the vertical focusing mirror 22 to be directed downward by the auto-focus mirror 34 into the auto-focus detector 36. This distance is referred to as light path OC, and like distance OA, must be substantially equivalent in length with OB; if not, any image captured by the image recording device 30 during auto-focus operation may also be out-of-focus or focus-shifted.

An SLR- or DSLR-type camera system is focused either manually through the eye-piece 26 or using the auto-focus detector 36 so that a plane of focus 12 is centered on about a target object O within an image. Furthermore, the camera/lens system 10 can also be set to have a desired depth of field 14 (or in-focus area), which is the distance in front of and in back of the object which is also acceptably in focus. Ideally, the plane of focus 12 selected by the focusing sensor is centered within the depth-of-field 14 in the image reaching the image recorder. However, it is quite possible for small inaccuracies to be present. The inaccuracies can be caused by problems within the camera body, the attached lens, or in a combination. For example, in the camera body there may be positioning and/or alignment problems with the semi-transparent window 32, the auto-focus detector 36, the auto-focus mirror 34, the image recording device 30, the transparent matte 24, and so forth. With auto focusing systems, errors may also be caused by the primary lens motor which is designed to quickly move the relatively-heavy lens to focus the image, resulting in problems both if the lens is moved too far or not far enough. A variety of other potential problems can also occur which shift the depth-of-field 14 forward or backward relative to the desired plane of focus 12.

If the plane of focus 12 is too far forward, for instance, only the portion of the imaged target object that is just behind the plane of focus, as viewed through the focusing sensor, will be in focus in the final image. This is known as back-focusing. Similarly, if the plane of focus is too far backward the resulting picture will be front-focused, and only the portion of the imaged target object which is just in front the plane of focus will appear in focus. If the degree of back- or front-focusing is known or measured, small screws with cams 42, 44 can be turned to adjust the mirrors, thereby equalizing the focusing light paths OA, OC with the image light path OB, and bringing the plane of focus back into alignment so that it is nearly centered at the object plane.

Basic measurement systems have been developed to evaluate the accuracy-of-focus for cameras that are susceptible to these types of focusing problems. Generally, the measurement system involves capturing an image of a scale printed on a piece of paper that has been tilted at a 45 degree angle relative to the plane of the image sensor. If the camera is correctly aligned and focused on a target located in the center of the scale, the demarcations on the scale will be in focus in the center of the image and out-of-focus towards the upper and lower edges of the image. Analyzing the position of the in-focus portion of the image on the scaled piece of paper can give an indication as to the location of the plane of focus and the width of the depth-of-field of the camera/lens system.

These measurement systems suffer from the common difficulty in establishing a repeatable alignment between the measurement plane and the camera, as most cameras must be both aligned square to and centered on the focusing target in order to obtain repeatable and accurate readings. Unfortunately, proper alignment of the camera system to the paper target is easier said than done, and accurately focusing the camera on the focus target in the center of the image, especially with an auto-focus detector, can also be problematic. Furthermore, the fine grid lines, small lettering and fixed perspective of the prior art systems can lead to difficulties in accurately identifying the in-focus and out-of-focus portions of the image. The inability to obtain repeatable measurements of the depth of field 14 relative to the plane of focus 12 can make it difficult to properly adjust or calibrate a camera/lens system. Additionally, sending a camera/lens system to a manufacturer or specialist for adjustment of the depth of field can be problematic if the owner and manufacturer or specialist uses different or inaccurate testing procedures.

SUMMARY OF THE INVENTION

The present invention seeks to overcome the problems and deficiencies of the prior art by providing a reliable and repeatable accuracy of focus measurement device to measure the focus accuracy of cameras that employ a different light path between the lens and the focusing sensor and between the lens and the film or image sensor. The measurement device of the present invention comprises a frame having a substantially planar front face with a focusing target located thereon, and at least one depth-of-field ruler coupled to the frame with a transverse axis or transverse centerline falling within a front face plane and a longitudinal axis that is angularly adjustable with respect to the front face plane. The invention can also include a sighting device operatively coupled to the frame that is configured to enable the plane of the image sensor of the camera to be aligned substantially parallel with the front face plane.

Furthermore, the present invention also provides a method for measuring the relationship between the plane of focus and the depth-of-field of a single lens camera system having a lens coupled to a camera body, which method includes obtaining a measurement device having a substantially planar front face with a focusing target located thereon, and at least one depth-of-field ruler with a transverse axis or transverse centerline falling within the front face plane and a longitudinal axis that is angularly adjustable with respect to the front face plane. The method further includes the steps of aligning the plane of the image sensor of the camera substantially parallel with the front face plane, focusing the camera on the focusing target, recording an image of the focusing target and the depth-of-field ruler, and reviewing the image to determine a center position and width of the depth-of field of the camera on the depth-of-field ruler.

Moreover, the method can also include the steps of adjusting the angle of the depth-of-field ruler, recording a second image of the focusing target and the depth-of-field ruler, and contrasting the second image with the first image to determine a center position and width of the depth-of field of the camera on the depth-of-field ruler.

BRIEF DESCRIPTION OF THE DRAWINGS

Features and advantages of the invention will be apparent from the detailed description that follows, and which taken in conjunction with the accompanying drawings, together illustrate features of the invention. It is understood that these drawings merely depict exemplary embodiments of the present invention and are not, therefore, to be considered limiting of its scope. And furthermore, it will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings, in which.

DETAILED DESCRIPTION OF EXEMPLARY EMBODIMENTS

Figure 1:
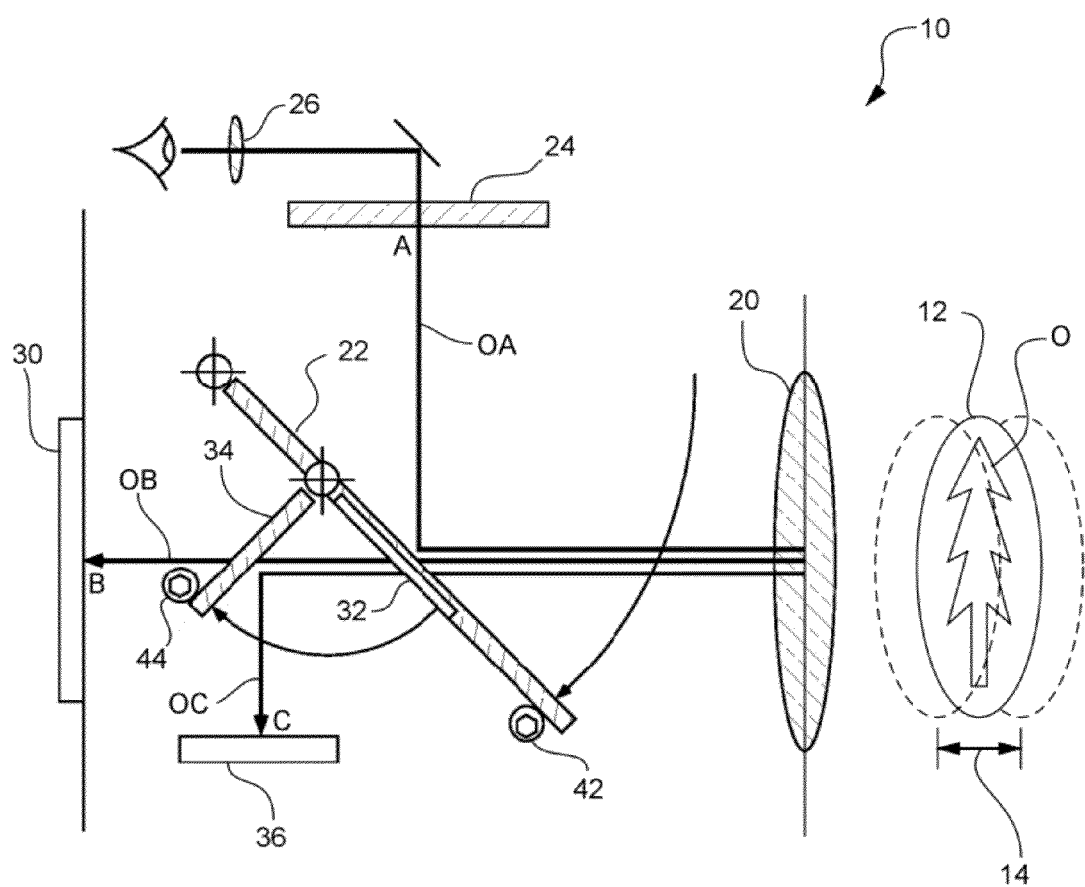
FIG. 1 is an illustration of the components and light paths within a single lens reflex ("SLR") or digital single lens reflex ("DSLR") camera and lens system.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

As previously discussed, the focus accuracy can be problematic for camera and lens systems which employ a different light path between the lens and the focusing sensor, and between the lens and the film or image sensor. The plane of focus determined by the focusing sensor should ideally be centered within the depth-of-field of the image to be recorded on the film or image sensor. However, it is quite possible for small inaccuracies to exist, either in the camera, the lens, or in the combination, which can shift the plane of focus determined by the focusing sensor either forward or backward within the depth of field captured by the image sensor. For instance, if the plane of focus is too far forward only the portion of the photographed object which is just behind the plane of focus will be in focus in the final image. This is known as back-focusing. Similarly, if the plane of focus is too far backward the resulting picture will be front-focused, and only the portion of the photographed subject which is just in front the plane of focus will appear in focus. As it is difficult to precisely determine why photographs may appear out-of-focus after taking a series of pictures, it can be beneficial to a photographer to provide a measurement device and system whereby the accuracy of focus can be determined in a controlled, repeatable setting.

Shown in various configurations in FIGS. 2-13 is one exemplary embodiment 100 of a device for measuring the accuracy of focus of a camera/lens system in which the light path to the surface of the film or image sensor may differ from the light path to the focusing sensor. More particularly, the exemplary embodiment may be used for measuring the accuracy of focus of single lens reflex (SLR) or digital single lens reflex (DSLR) camera systems. Furthermore, the figures are also given as illustration of a method for measuring the accuracy-of-focus of a camera/lens system, and for determining how that accuracy can change as various interchangeable lenses are switched into and out of the camera body. Thus, if it is established that a focusing problem exists, the measurement device and method of the present invention provides the additional benefit of further isolating whether the problem is associated with the camera body or with a particular lens or a group of lenses.

Moreover, the measurement device of the present invention can be used with the traditional manual focus system focusing as well as auto-focus systems. With most SLR or DSLR cameras sold today using the three separate light paths to focus and record images, it is beneficial to the serious photographer to verify the accuracy of both the manual and auto-focusing systems to allow the photographer to correct or compensate for any inaccuracies as needed when recording an image.

Finally, the measurement device of the present invention can also be used to correct both user adjustable and non-user adjustable camera systems. The measurement device of the present invention provides the needed information to identify and confirm changes needed to bring a selected camera body or lens within specification. Focusing accuracy problems in adjustable camera systems can be corrected directly by the user with software and built-in automated means or by adjusting the screw/cams in the SLR mirror system. Alternatively, the end-user can accurately identify the focusing problem with the present invention and then send the camera and lenses back to the manufacturer or qualified repair facility. The repair facility can rely on the information from the user obtained using the measurement device. On the other hand, the repair facility can use the same measurement device to confirm the problem, make the needed corrections and verify that the adjustments were successful.

It should be noted that some camera OEM specifications may not require that the plane of focus be centered within the depth of field. Some types of devices and setups allow the plane of focus to be directed more behind of or in front of the target object captured in the image. For example, an image of a target object captured with a camera/lens system with ⅔ of the in-focus area (of depth of field) being in front of the target may still be considered within the manufacturer's specifications for the camera/lens system. The present invention provides a user with the ability to accurately and repeatably measure whether their camera/lens system is within the tolerances set by a particular manufacturer.

Figure 2:
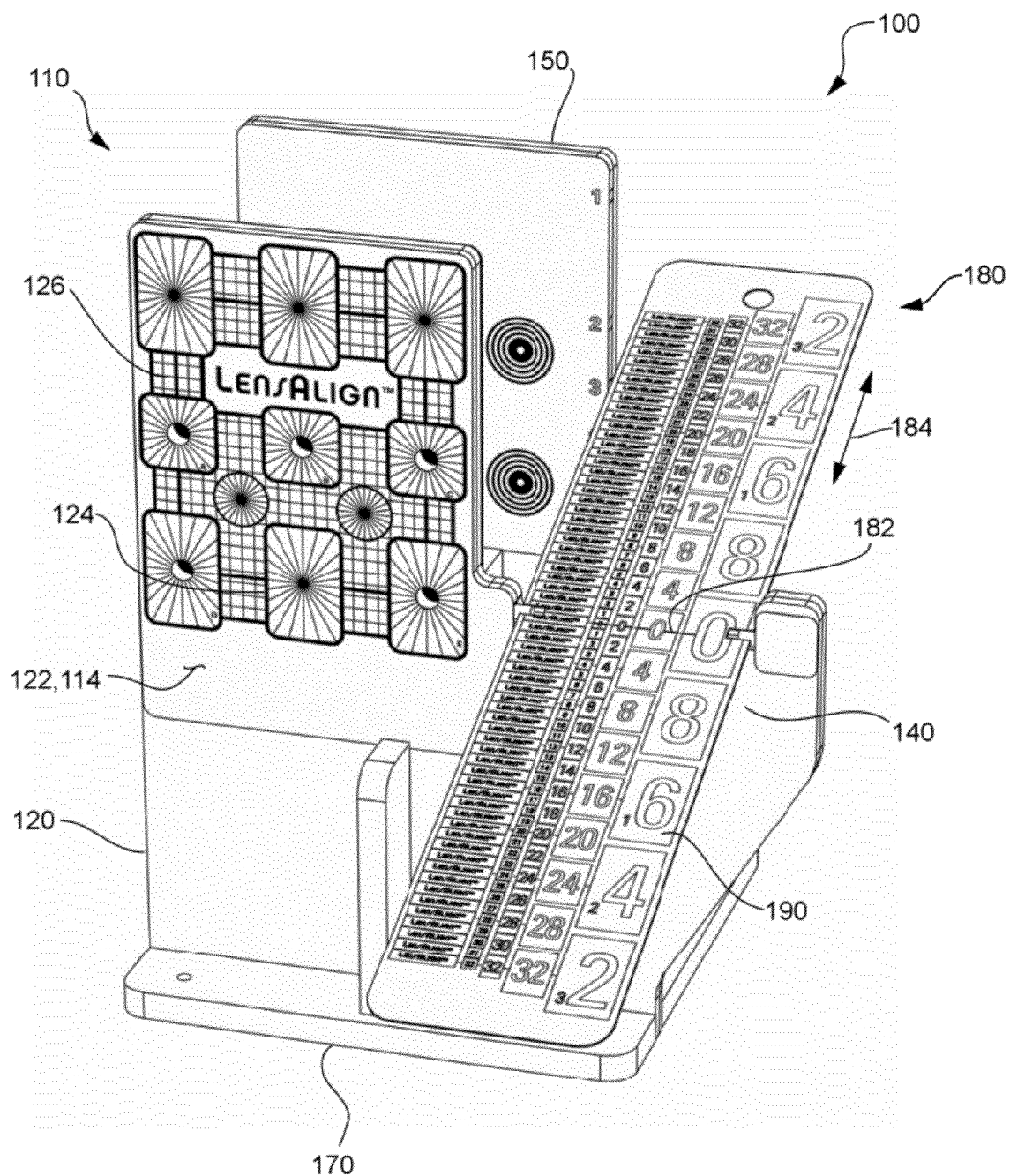
FIG. 2 is a front perspective view of an accuracy-of-focus measurement device, in accordance with an exemplary embodiment of the present invention.

As illustrated in FIG. 2, a system in accordance with one embodiment of the present invention and indicated generally at 100, is shown for providing a means for repeatably and reliably measuring the accuracy-of-focus of a camera/lens system. The measurement device can comprise a measurement frame 110 having a front support plate 120, a back support plate 150, and a base 170 that connects and aligns the two support plates parallel to each other and at a distance a few inches apart from each other. A depth-of-field ruler 180 can be supported in a ruler cradle 140 located to one side of the front face 122 and focusing targets 124. The depth-of-field ruler 180 can be angularly adjustable with respect to the front face plane 114.

The front support plate 120 can have a planar front surface or face 122 that defines a front face plane 114. The front face plane 114 can be a plane that extends indefinitely to provide a reference point for the measurement device 100, which plane is substantially vertical in the embodiment shown. One or more flat focusing targets 124 can be located on the front face 122 of the measurement frame. The focusing targets can be flat, flush or co-planar with the front face plane 114 and can include a variety of indicia 126, such as lettering or symbols. Such indicia can provide high contrast images to better enable a camera/lens system, comprising a camera body attached to one or more lenses, to be accurately focused on the front face plane 114. The high contrast images can be in black and white. Alternatively, the high contrast images can be provided in high contrasting colors as well.

The depth-of-field ruler 180 can be marked with various indicia 190, including both numerical data and a pattern of repeating geometrical symbols or shapes. The pattern of repeating geometric shapes and numbers can be calibrated to provide an accurate horizontal distance measurement of the image's depth-of-field when the ruler is positioned at a variety of acute angles relative to the front face plane 114. The angles can range from about 45 degrees from the substantially vertical front face plane 114 to about 90 degrees (or near horizontal) form the front face plane 114.

The depth-of-field ruler can also be provided with notches or similar structure which allows the ruler to be pivotably coupled to registering surfaces on the ruler cradle 140, so that the long or longitudinal axis 184 of the ruler can be pivoted to a variety of acute angles while maintaining a transverse axis 182 that is aligned within the front face plane 114. Although not required, the transverse axis 182 can also be the transverse centerline of the depth-of-field ruler.

The major components of the exemplary embodiment 100 illustrated in FIG. 2, specifically the front support plate 120, the back support plate 150, the base 170 and the depth-of-field ruler 180, can be separated and disassembled into separate modules that can lay flat and together can fit inside a small shipping envelope or box. Thus, one important aspect of the present invention is that it can be easily disassembled and shipped, and even shipped together with the camera, so that more than one party can use the same measurement device to measure the accuracy of focus of the camera/lens system. Additionally, the ability to disassemble and store the device in a relatively small space enables the device to be stored in a typical camera bag, thereby allowing the device to be used when necessary with the camera system.

It is to be appreciated that while the embodiment 100 illustrated in FIG. 2 uses two vertically-aligned and parallel plates 120, 150 to support the depth-of-field ruler 180 and to provide a front face 122 for locating the focusing target(s) 124 and for defining the front face plane 114, nothing should be construed from the figures as limiting the physical structure of the invention to that of the embodiment shown. Any structure which can simultaneously provide a focusing target and support at least one depth-of-field ruler that is angularly adjustable to the front face plane is considered to fall within the scope of the present invention.

Figure 3:
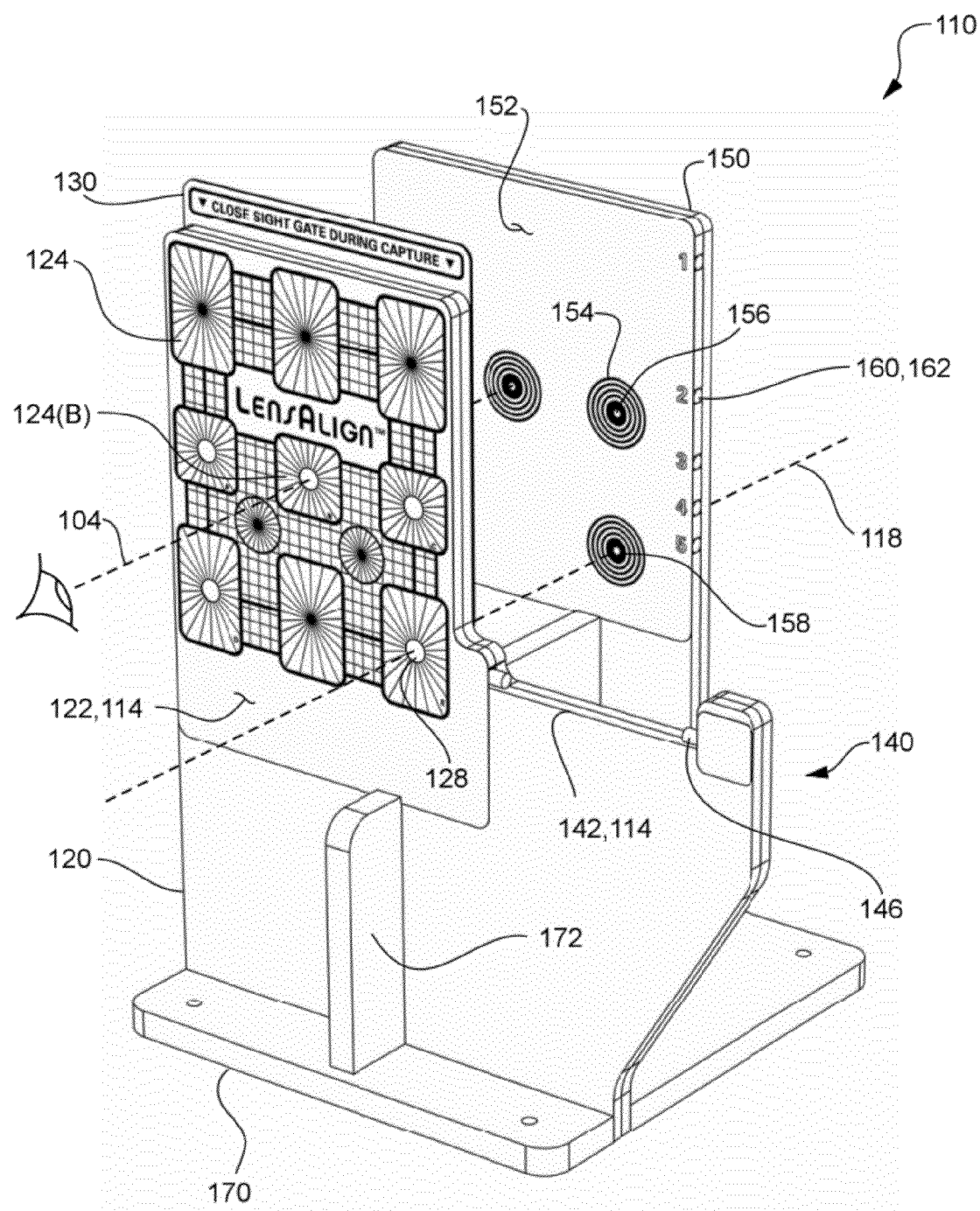
FIG. 3 is a front perspective view of the frame of measurement device, in accordance with the embodiment of FIG. 2.
Figure 4:
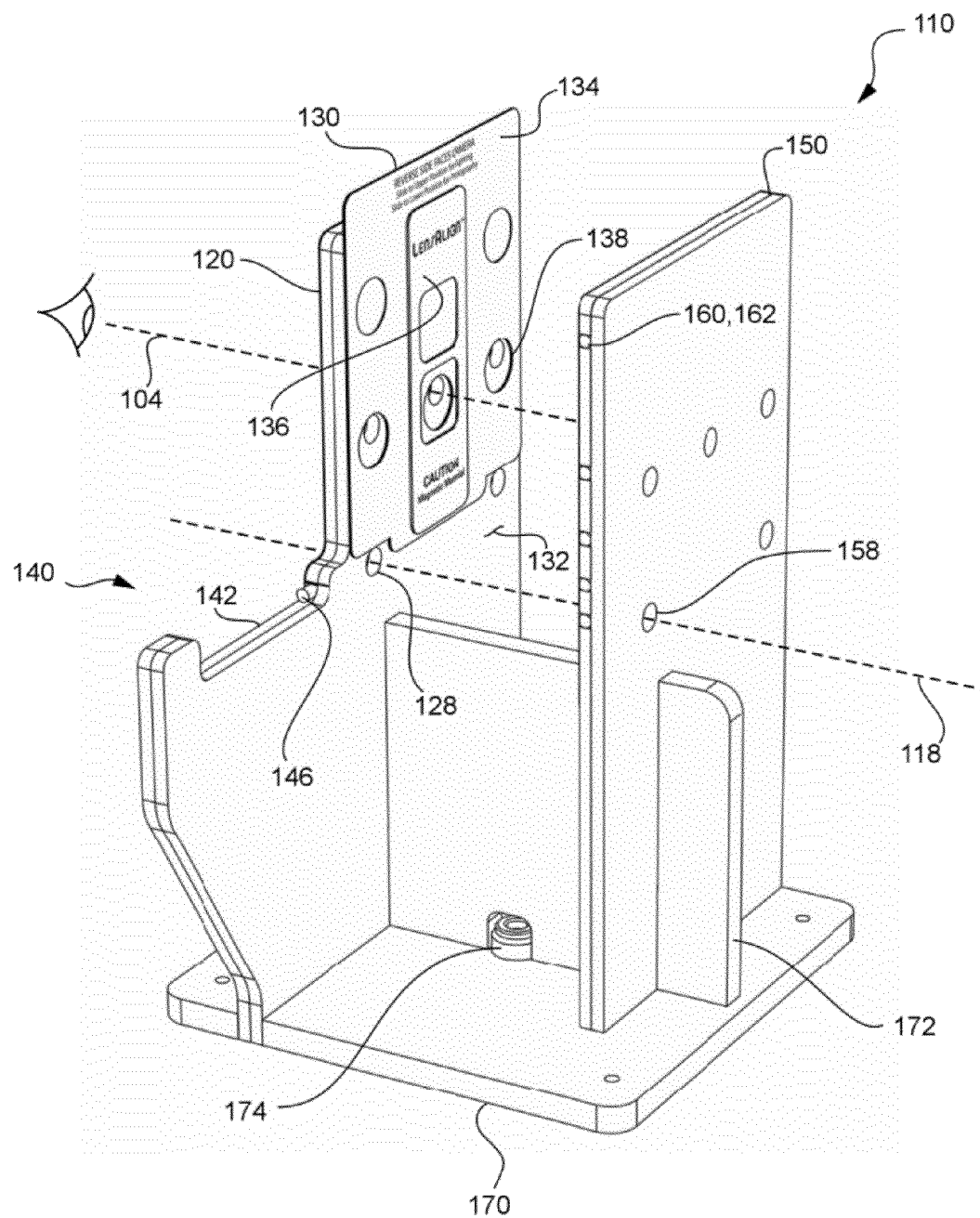
FIG. 4 is a back perspective view of the frame of measurement device, in accordance with the embodiment of FIG. 2.

The frame 110 of the measurement device 100, generally comprised of the front support plate 120, the back support plate 150 and the base 170, is shown in more detail in FIGS. 3 and 4. The three sections may be formed of plastic, paper, metal, a composite of multiple materials, or another material capable of supporting the ruler 180 and focusing targets 124. The front support plate can have one or more focusing targets 124 located on or integrated with the front face 122. A plurality of front thru-holes 128 can be strategically located in the focusing targets 124, and can pass entirely thought the thickness of the front support plate 120.

A sliding shutter 130 having a plurality of shutter holes 138 (see FIG. 4) can be mounted to the backside surface 132 of the front support plate 120. The sliding shutter can be a paper or cardboard sheet 134 that is magnetically coupled to the vertical surface 132 by way of an attached magnetic strip 136 that is attracted to metallic studs (not shown) located flush in the backside surface. The paper or cardboard sheet 134 can be positioned between the magnetic strip and the metallic studs, allowing the sliding shutter 130 to freely slide across the front support plate 120. Although the sliding shutter 130 is shown attached to the backside surface of the front support plate, the shutter could also be mounted to the front side of the front support surface or even within a center portion of the front support plate, if the front support plate were thick enough.

The front thru-holes 128 in the front support plate 120 and the shutter holes 138 in the sliding shutter 130 can be aligned when the sliding shutter is in the open position, to permit the user to look through the front support plate to see the back support plate. There can be any number of front thru-holes 128 in the front support plate and focusing targets, with corresponding shutter holes 138 in the sliding shutter.

The back support plate 150 can have a forward-facing surface 152 upon which a plurality of sighting targets 154 can be located. The sighting targets can be configured with a high-contrasting pattern that clearly indicates an alignment dot or center point 156. The center point can be concentric with the corresponding thru-hole 128 in the front plate 120, forming a common centerline 118 that is perpendicular to the front face plane 114. Thus, a user can look through the camera's optics and sight through a front thru-hole 128 to view the corresponding sighting target 154 on the back support plate when the shutter 130 is in the open position. The user can then adjust the relative position of the camera and measurement device until the center point 156 is visible and centered in the front thru-hole 128. This action can align the centerline sight axis 104 of the camera/lens system with the common centerline 118 between a front thru-hole and its corresponding sight target 154, and simultaneously position the plane of the image sensor (or photographic film) to be substantially parallel with the front face plane 114.

Alternatively, the forward-facing surface 152 of the back support plate 150 can be coated with a paint or covering having a high-contrast visual color, such as a bright orange color, that is visually distinguishable from the color or surface markings on the focusing target 124, and which can be easily seen and identified when looking through the front thru-holes 128. The painted surface can also have back alignment dots, center points or back thru-holes which are aligned with the front thru-holes.

The number and placement of the front thru-holes 128 and rear sighting targets 154 allows the camera position to be adjusted in both the vertical and horizontal directions. In one aspect, the camera can be aligned to the center focusing target 124(B) near the exact center of the front face 122, which location can be slightly above the pivoting transverse axis 182 (FIG. 2) of the depth-of-field ruler. In other aspects, however, the centerline sight axis 104 of the camera/lens system can be aligned closer to or further from the depth-of-field ruler or in-line with the pivoting transverse axis of the depth-of-field ruler, according to user preference. After the camera has been aligned, the sliding shutter 130 can be moved to the closed position, which blocks the front thru-holes 128 and prevents the auto-focusing system on the camera from accidentally focusing through the front support plate to the back support plate when capturing a measurement image.

In one aspect of the present invention, a card-holding bracket (not shown) can be mounted to the front support plate 120 to support a writable card or pad below the front face 122, away from the focusing targets 124 but still within the field of view camera when taking a measurement image. The card or pad can be removed and replaced from the card-holding bracket without touching the body of the measurement device and accidentally bumping the measurement device out of alignment with the camera. Writable cards or pads supported in the card-holding bracket can be an advantageous aspect of the present invention, permitting the user to easily document the camera, lens, date and camera settings from within captured measurement image.

Also shown in FIGS. 3 and 4 is a mounting system for supporting the depth-of-field ruler. The front support plate 120 can have a mounting cradle 140 for the depth of field ruler located to one side of the front face 122 and extending laterally or horizontally away from the front face. In one aspect, the cradle 140 can have a pivot support edge 142 that can support the depth-of-field ruler and define a pivot line that falls within the front face plane 114. In another aspect, the cradle 140 can include registering hinge support magnets 146 that can locate and register a metallic ruler above the pivot support edge 142 to better maintain the transverse axis of the ruler within the front face plane throughout a range of angular positions.

A plurality of back ruler supports 160 can be formed in the corresponding side edge of the back support plate 150 to support the back portion of the depth-of-field ruler. While the front pivot support edge 142 or hinge support magnets 146 can provide primary support for the depth-of-field ruler at a proper height and transverse axis alignment that falls with the front face plane 114, the back ruler supports 160 can facilitate the positioning of the depth-of-field ruler at discrete, predetermined angles ranging from about 45 degrees relative to the front face plane 110 to about 90 degrees (i.e. near horizontal). After the camera/lens system has been properly aligned to the front face plane 114, this capability allows the angle of the depth-of-field ruler to be adjusted between image captures. The different angular positions of the depth-of-field ruler can provide more detail regarding the position of the plane of focus of the camera's focusing sensor in relation to the imaging sensor's depth of field.

As shown in FIGS. 3 and 4, the plurality of back ruler supports 160 (labeled 1-5) can be magnetic inserts 162 which can magnetically hold and support the back section of a metallic depth-of-ruler in a pre-determined angular position. However, it is to be appreciated that in other embodiments of the present invention the back ruler supports 160 can comprises notches formed in the edge of the back support plate 150, pins with or without corresponding pin insert holes, hooks, sticky tape or adhesive, or any other means which could be used to movably support the depth-of-field ruler at a predetermined angular position.

The base 170 of the measurement device's frame 110 can include a vertical cross-brace member 172 that interconnects with both the front and back supporting plates 120, 150. In one aspect of the invention, both the horizontal base 170 and the cross-brace member 172 can include profiled attachment slots to receive and hold the supporting plates. One inside surface of each slot (likely an interior side) can be a registering surface that is flat and square relative to registering surfaces in the other slots, so as to maintain the two supporting plates aligned and parallel with each other. The opposite inside surface of each slot can be provided with a slightly-raised contact surface (or plateau) that, by means on the slight interference fit, can apply a constant force that presses the supporting plates against the registering surface.

In another aspect of the invention, either or both of supporting plates 120, 150 or the horizontal base 170 and cross-brace member 172 can have tapered, self-aligning slots that allow the user to quickly assemble the frame 110 with the front and back supporting plates being aligned and substantially parallel with each other. Similarly, other registering features, such as registering pins or tabs with corresponding pin holes or slots, can also be envisioned to ensure that front and back supporting plates are correctly positioned. The base can also include a threaded adaptor or standard tripod mount 174 that allows the frame to be attached to a typical camera tripod.

Figure 5:
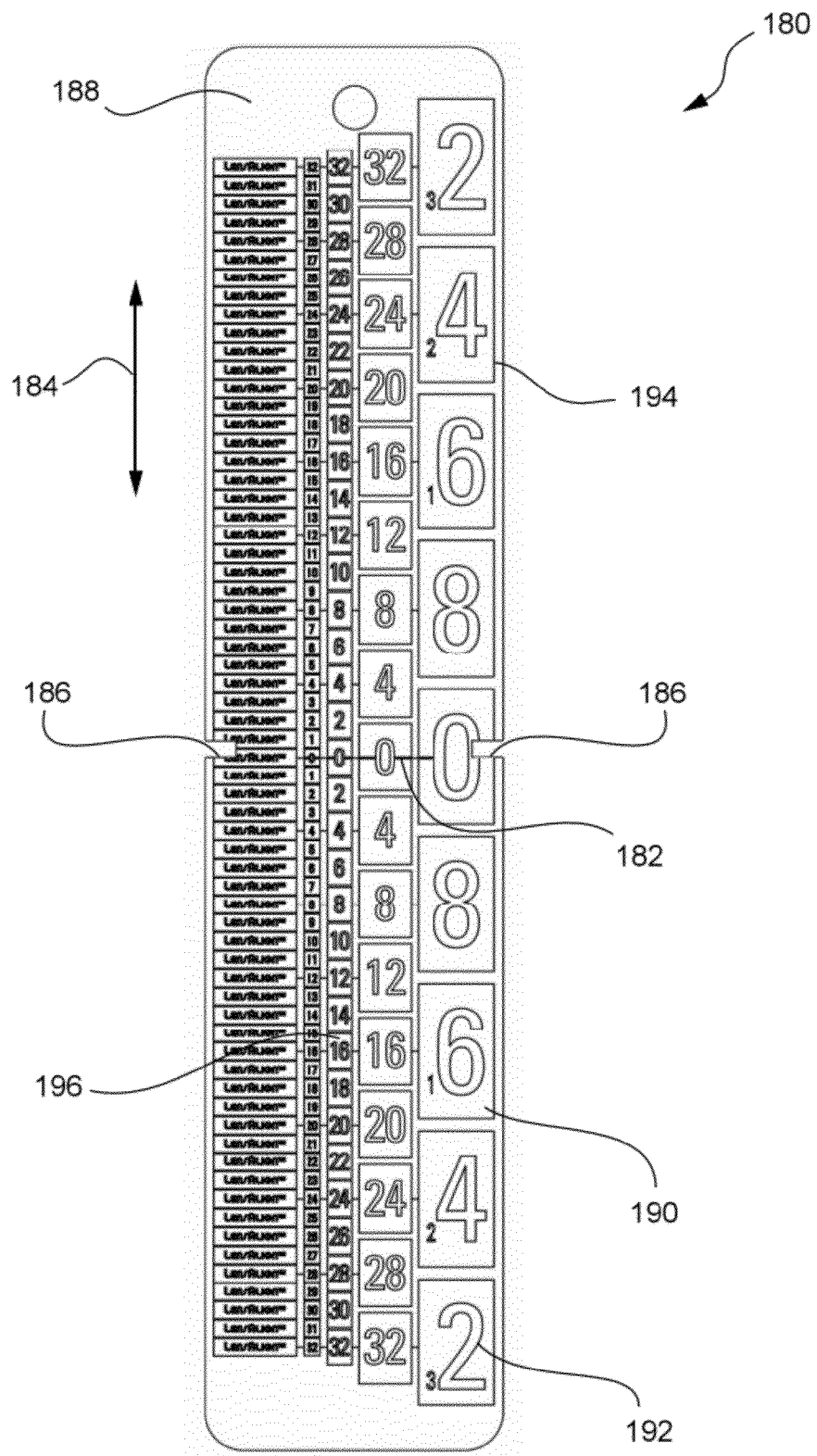
FIG. 5 is a top view of the depth-of-field ruler, in accordance with the embodiment of FIG. 2.

The depth-of-field ruler 180 is illustrated in more detail in FIG. 5. The ruler can have a long axis 184 and a transverse (or pivot) axis 182, and can be configured with ruler notches 186 located at the transverse axis 182 which be used to locate and register the transverse axis of the ruler against corresponding registering surfaces on the ruler cradle. Thus, the ruler notches can define the transverse (or pivot) axis 182 about which the long or longitudinal axis 184 of the ruler can rotate. In the embodiment shown, the ruler notches 186 can be aligned with the centerline axis of the ruler, being substantially equidistant from both ends of the ruler. However, it is to be appreciated that ruler notches 186 and transverse axis 182 can also be located at a position other than at the centerline axis.

The depth-of-field ruler may be marked with indicia 190, which can include both numerical data 192 and a pattern of repeating geometrical shapes 194 such as diamonds, circles, ovals, squares, polygons, etc. A pattern of repeating geometric shapes, such as the squares illustrated, can provide distinct advantages over the lines and lettering taught in the prior art. For example, the high contrast between the edges of the squares and the ruler background can promote easier identification of the boundary between that portion of the ruler which is in-focus and that portion which is out-of-focus. Moreover, the geometric shapes can be configured in a distinctive repeating pattern, and can be easily scaled up or down to proportionally larger or smaller shapes 196 to provide for finer measurements. This can beneficially allow the user to zoom in and frame the image with more detail around the finer portions of the rulers, providing greater precision when evaluating the accuracy of focus of the camera/lens system. The pattern of repeating geometric symbols may be especially useful in situations involving the accuracy of a telephoto lens, in which the resolution of the captured image may be diminished and the numbering less distinguishable than with standard lenses.

Each geometric shape 194 can have a number 192 included therein for identification purposes, with the numbers increasing with increasing distance from the transverse (or pivot) axis 182 of the ruler. In one aspect, the numbering in the proportionately larger shapes can reflect the last digit of the numbers in the adjacent smaller shapes, which smaller shapes can provide the continuously increasing scale. This referencing can facilitate more accurate measurement of the region of the depth-of-field ruler that is in-focus in the measurement image.

In another aspect of the invention, the pattern of repeating geometric shapes and numbers can be calibrated to provide an accurate horizontal distance measurement when the depth-of-field ruler is positioned at an angle other than true horizontal. For instance, a depth-of-field ruler having a repeatable pattern of large 1.0 inch squares will not accurately indicate the true distance from the ruler centerline when tiled at an angle of 45 degrees to the front face plane. To compensate, the pattern of geometric shapes can be stretched (or calibrated) for the steeper angles, so that the apparent intersections between the geometric shapes better reflect the true horizontal distance from the plane of the focusing target with the depth-of-field ruler positioned at a specific angle. The depth-of-field ruler can be reversible top-to-bottom and can be marked with different calibrated indicia on the top surface 188 and bottom surface, with one side marked for accurate measurement with the ruler in a flat position and other for accurate measurement at an acute angle nearer to 45 degrees.

Figure 6:
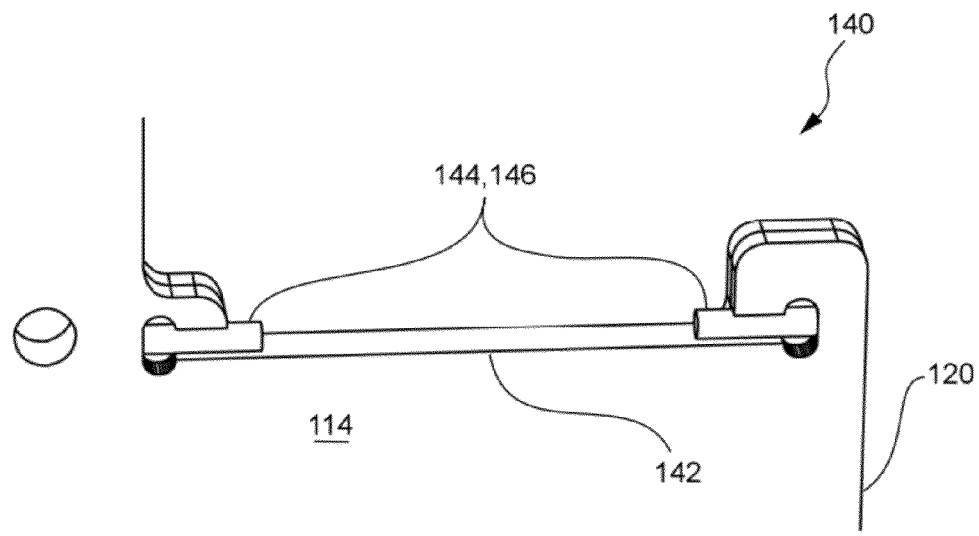
FIG. 6 is a close-up view of the pivot cradle of the frame of the measurement device, in accordance with the embodiment of FIG. 2.
Figure 7:
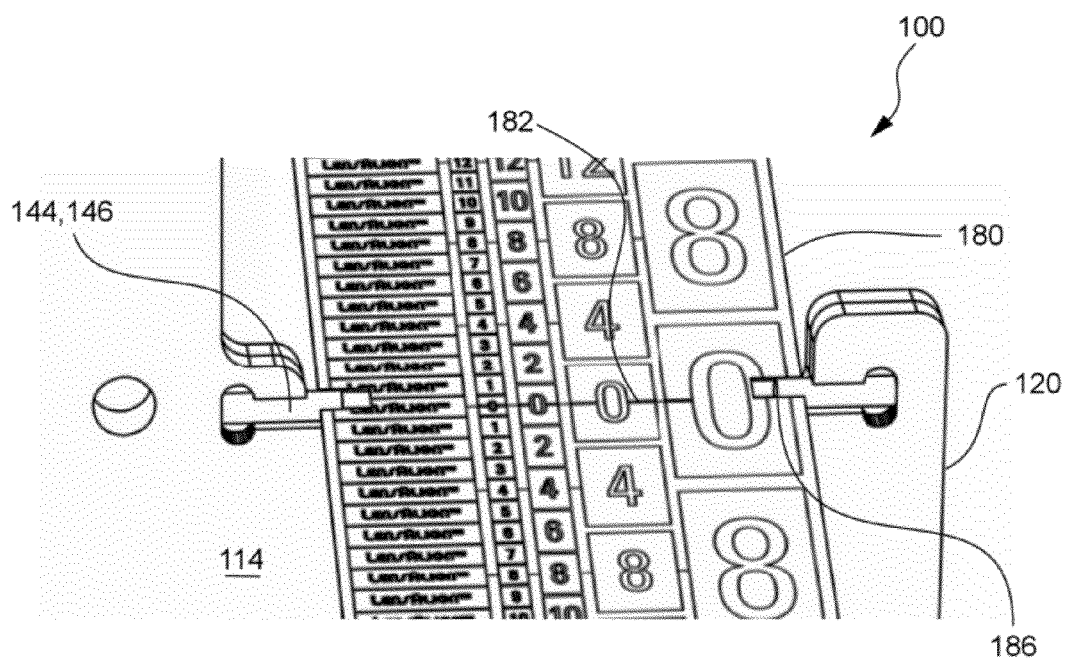
FIG. 7 is a close-up view of the transverse centerline axis of the depth-of-field ruler in the pivot cradle, in accordance with the embodiment of FIG. 2.

As stated above, the ruler cradle can be provided with registering surfaces that can be used to located and register the depth-of-field ruler against a pivot support edge which falls within the front face plane. FIGS. 6 and 7 illustrate a plurality of registering surfaces or hinge support structures 144 that enable the ruler 180 to be pivotally mounted and aligned to the mounting cradle 140 at a location wherein the transverse (or pivot) axis 182 of the depth-of-field ruler is located in the front face plane 114. This arrangement allows a user to focus his or her camera/lens system on the focusing targets and accurately measure a location of the depth-of-field range of the camera/lens system using the depth-of-field ruler. The hinge support structures 144 can be received into the ruler notches 186 formed on the depth-of-field ruler to positively align the transverse axis 182 of the ruler against the pivot support edge 142. Furthermore, the hinge support structures 144 can support the ruler and keep it from sliding out of position when positioned at a steep angle, such as the 45 degree angle.

In one aspect of the invention, the depth-of-field ruler 180 can be constructed of a metallic material such as steel, stainless steel, iron, nickel, and the like. The hinge support structures 144 can also be formed from a magnetic material to form hinge support magnets 146. The hinge support magnets 146 can have sufficient strength to allow the ruler to maintain its position within the measurement device 100. Because the depth-of-field ruler 180 can include one or more ruler notches 186 at the transverse pivot axis 182, the ruler can be coupled to the hinge support magnets 146 by aligning the notches in the ruler with the hinge magnets, thereby magnetically coupling the depth-of-field ruler to the mounting cradle 140 and allowing the ruler to be pivotally mounted to the front support plate 120.

In one aspect of the invention, the width of the ruler notches 186 can be slightly smaller than the diameter of the hinge support magnets 146 so that the depth-of-field ruler rides and pivots over the top surfaces of the hinge support magnets 146, rather than over the pivot support edge 142. This can better maintain the transverse axis 182 of the ruler within the front face plane 114 throughout the range of angular positions. The magnetic coupling between the magnets 146 and the metallic ruler 180 can be sufficient to secure and hold the depth-of-field ruler in place and keep it from sliding out of position when positioned at a steep angle, such as the 45 degree angle.

While the embodiment illustrated in FIGS. 6 and 7 shows two separate hinge support magnets 146 configured to be accepted into two notches 186 in the ruler 180, other variations are possible. For example, a single hinge support magnet may extend across the entire mounting cradle and form the pivot support edge. The ruler can also include a groove or notch continuing laterally across a center point of the ruler. The single hinge support magnet can be aligned and received within the groove, thereby allowing the ruler to be pivotally mounted to the front support plate 120.

The use of the hinge support magnets 146 and ruler notches 186 to pivotally mount the depth-of-field ruler 180 provides a relatively simple, quick and inexpensive means for accurately mounting the ruler in the accuracy of focus measurement device 100. However, other configurations are also possible. For instance, restraining fingers (not shown) can fit over the top surface of the ruler surface to grip the ruler and hold them in place, and to provide a good visual indication that the transverse centerline of the depth-of-field ruler is correctly aligned with the front face plane 114. Similarly, an elastic restraint system can extend between the base of the front support plate 120 and the center section of the depth-of-field rulers, and can comprise a series of mechanical springs or elastic cords or bands. Instead of a magnetic force or gravity, the elastic restraint system can apply a preload which holds the depth-of-field rulers in place against the front and back support plates, and more specifically can pull the ruler notches against the registering surfaces of the pivot edge support to positively lock the transverse axis of the ruler into parallel alignment with the front face plane. In such an embodiment the depth-of-field rulers can have holes formed therein for attachment of the elastic restraint system to the rulers.

Figure 8:
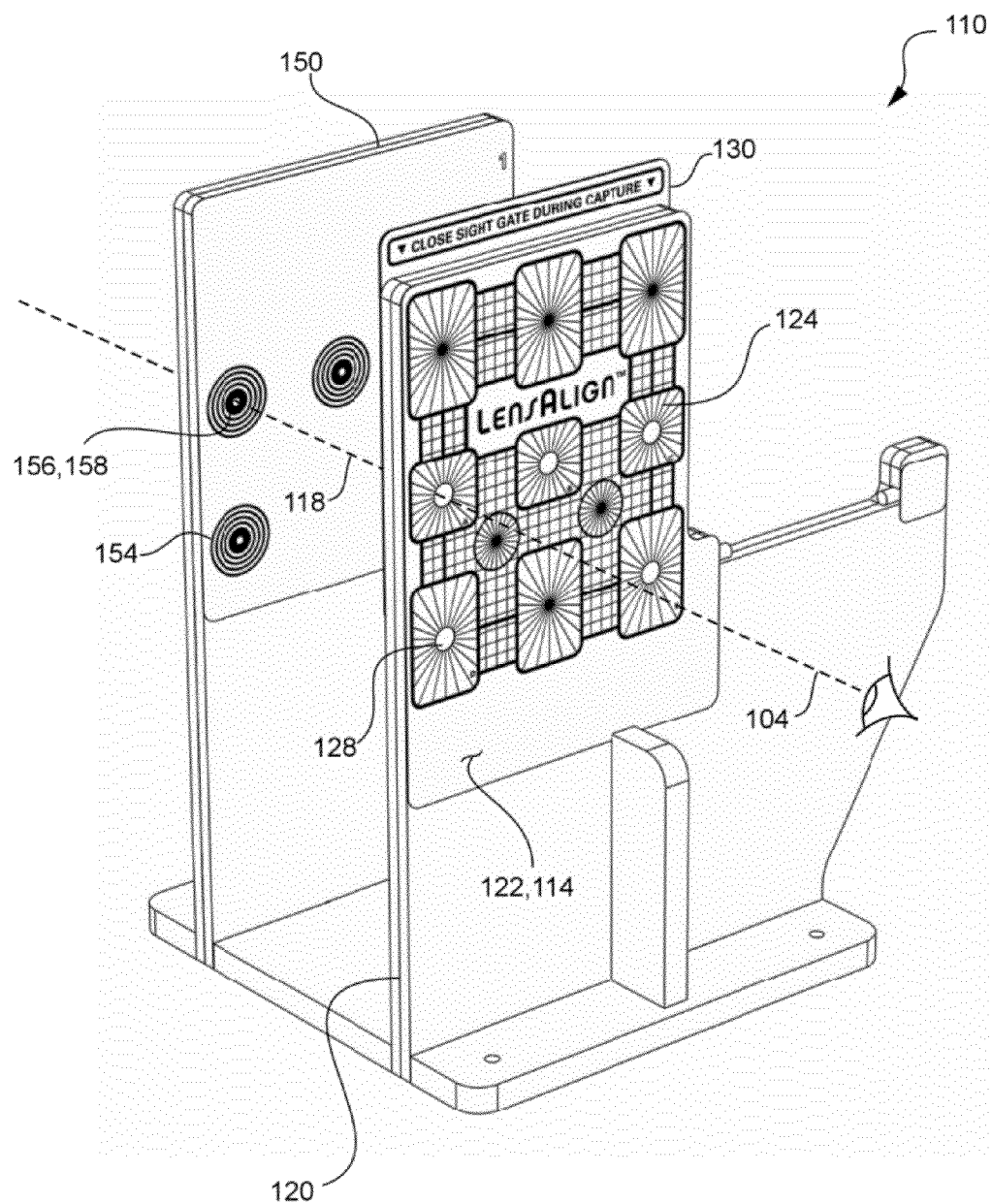
FIG. 8 is a front perspective view of the frame of the measurement device with the shutter in the open position, in accordance with the embodiment of FIG. 2.
Figure 9:
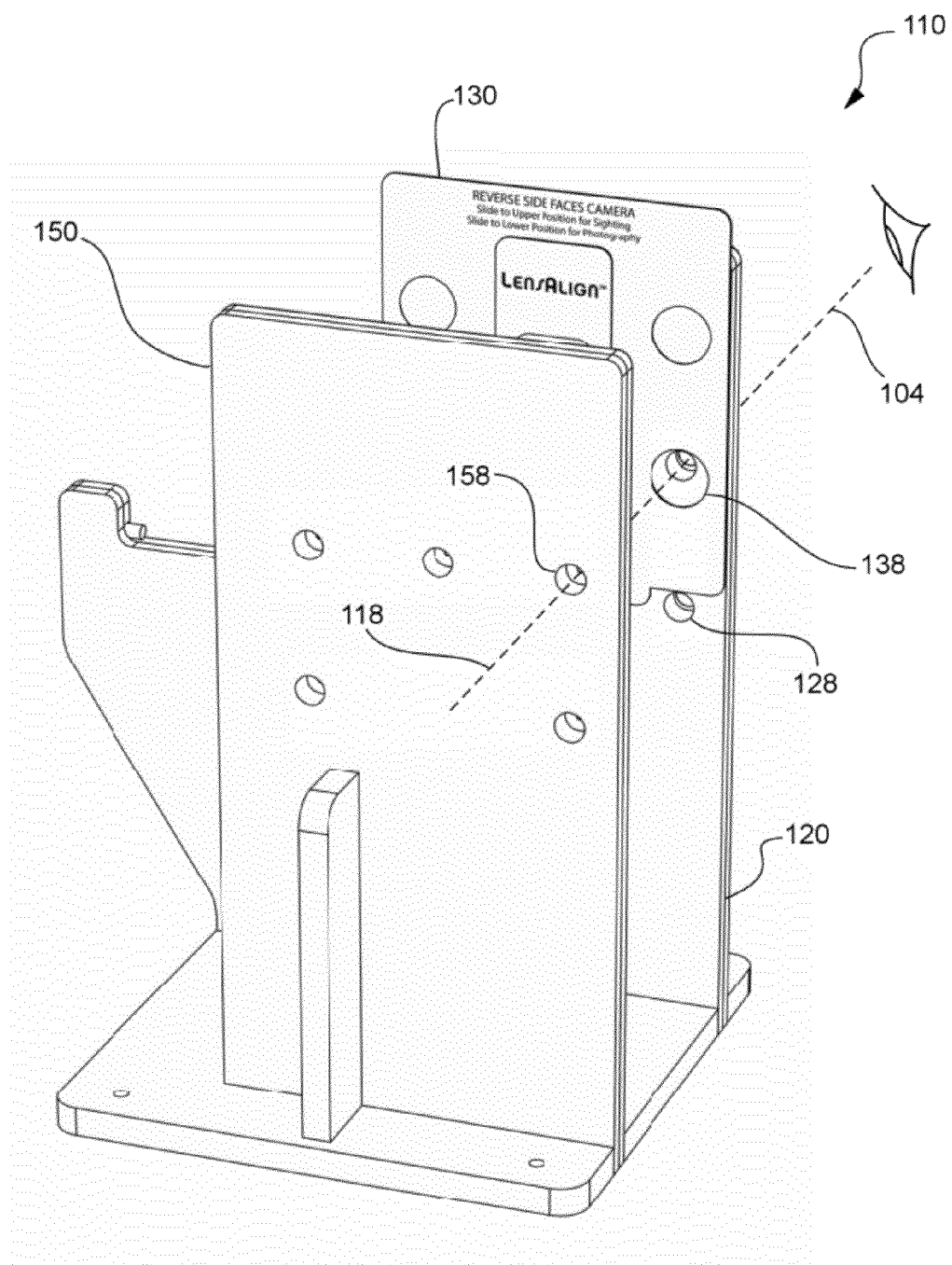
FIG. 9 is a back perspective view of the frame of the measurement device with the shutter in the open position, in accordance with the embodiment of FIG. 2.
Figure 10:
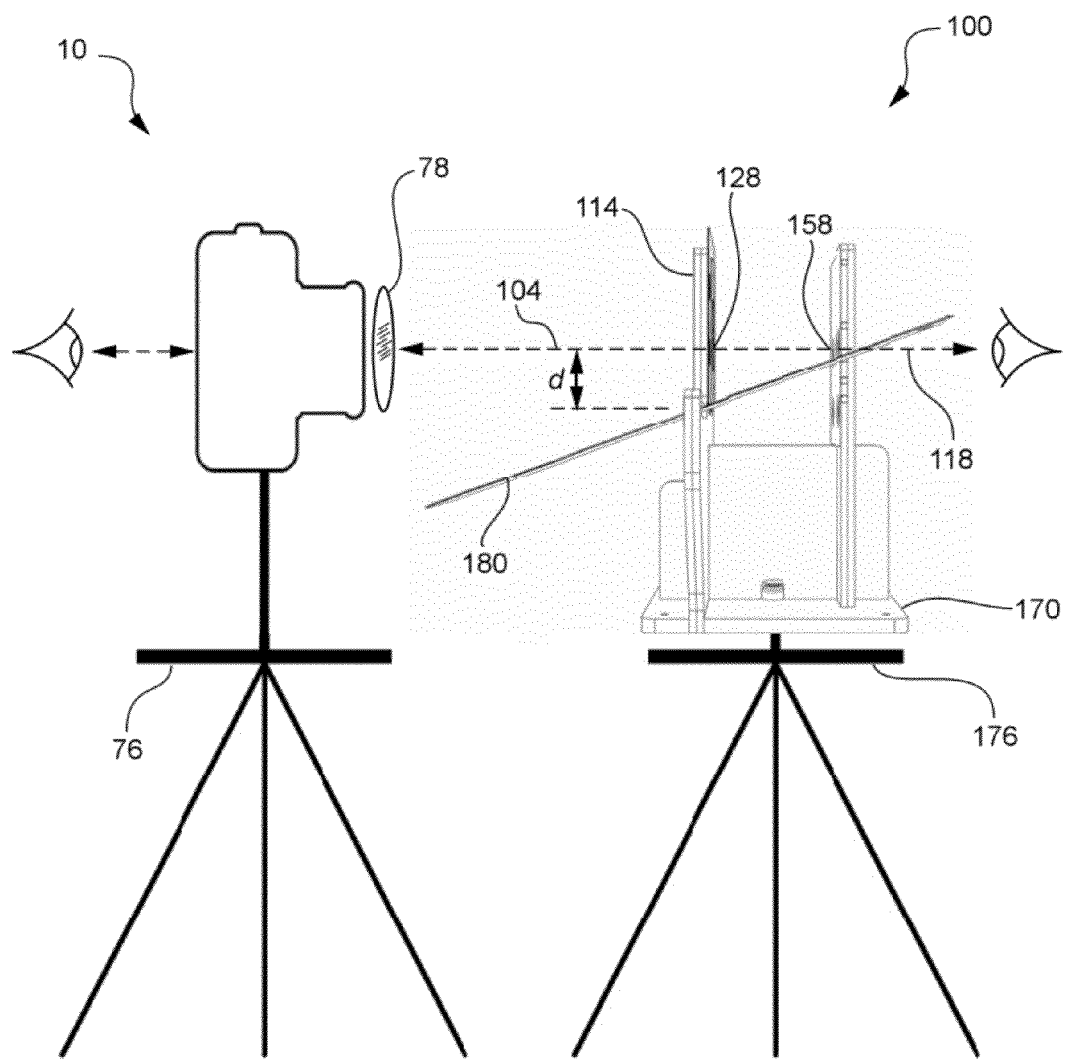
FIG. 10 is a side schematic view of aligning the measurement device with the camera, in accordance with the embodiment of FIG. 2.

FIGS. 8-10 are further illustrative of the sighting system and method which can be used to align the centerline sight axis 104 of the camera/lens system to be perpendicular to the front face plane 114, while simultaneously aligning the plane of the image sensor 30 (FIG. 1) (or photographic film) of the camera to be substantially parallel with the front face plane 114. This can be an important element in achieving accurate and repeatable measurements of the location of the depth of field.

As discussed hereinabove, the sighting system can comprise a plurality of front thru-holes 128 formed in the front face 122 of the front support place 120, and a plurality of corresponding sighting targets 154 located on the back support plate 150. The front thru-holes 128 can be strategically positioned within the focusing targets 124 located on the front face, and can pass entirely through the thickness of the front support plate 120. The sighting targets 154 can comprise a high-contrasting pattern, such as a bulls-eye, that clearly indicates an alignment dot or center point 156. The center point can be concentric with the corresponding front thru-hole. Thus, with the shutter 130 in the open position, a user can look through the camera's optics and sight through a front thru-hole 128 and sliding shutter hole 138 to view the corresponding sighting target 154 on the back support plate. The user can then adjust the relative position of the camera and measurement device until the center point 156 in the sighting target 154 is visible and centered in the front thru-hole. This can then align the centerline sight axis 104 of the camera/lens system to be perpendicular to the front face plane 114, and simultaneously position the plane of the image sensor (or photographic film) to be parallel with the front face plane 114.

In another aspect of the invention, each center point 156 of the sighting targets 154 can further comprise a back thru-hole 158 that can pass entirely through the thickness of the back support plate 150. The back thru-holes 158 can be concentric with a corresponding front thru-hole 128 and can have a common centerline 118 that is perpendicular to the front face plane 114. This allows the user to look through the sighting device of the camera and position the camera until any pair of front and back thru-holes are aligned such that the user can see through both holes at the same time. The back thru-hole can be smaller than the front thru-hole, and a light source can be situated behind the measurement device (or within the back thru-hole itself) to provide an illuminated pin hole, which can improve visibility of the center point from the front of the measurement device. Using this method, the user can ensure that the centerline sight axis of the camera 104 is aligned with the centerline 118 of the two sighting holes, thereby providing that the plane of the imaging sensor is parallel to the front face plane 114.

The user can also roughly align a centerline 118 of the measurement device 100 with the camera from behind the measure device by looking forward from the back thru-hole 158 through the front thru-hole 128 to see the camera. For example, as shown in FIG. 10, a user may attach the accuracy-of-focus measurement device 100 to a tripod 176 or other type of supporting apparatus. The camera can be mounted to its own tripod 76 or supporting apparatus. The user can then position himself behind the measurement device, look through the back thru-hole 158, and roughly adjust the height and angle of the measurement device on the tripod 176 until the camera 10 can be viewed through the front thru-hole 128. The user can also mount a reflective mirror 178 over the camera lens, allowing the user to see a reflection of the measurement device off the front lens. This can facilitate and speed the rough alignment process.

After roughly aligning the measurement device 100 with the camera 10, the user may reverse positions and observe the measurement device through the camera, as discussed above. The user can then adjust the height and/or position of either the camera 10 or the measurement device 100 (via the tripods) for fine tuning of their relative positions until the centerline sight axis 104 of the camera is aligned with the common axis 118 of the two sighting holes 128, 158, thereby indicating that the image sensor is orientated substantially parallel and square with the front face plane 114. It should be noted that this drawing is not done to scale and is not intended to properly illustrate the size of the sighting device relative to the camera or tripod.

With modern digital SLR cameras, it may also be possible to connect an external display or monitor to the electronic viewfinder or LCD screen output, allowing the user to remotely monitor the view from the camera and lens system in real time. Under these circumstances it may be possible fix or secure the camera in space and finely adjust the position of the measurement device relative to the camera instead.

In yet another aspect of the invention, a sight tube (not shown) may be used as an alternative to the sighting device shown in the illustrated embodiment 100. The sight tube can be removably attached to the measurement frame 120 and can have an internal thru-passage that can be positioned to be perpendicular to the front face plane 114. Any configuration of a sight tube or similar sighting device can serve to properly align the plane of the image sensor with the front face plane, as long as the tube is sufficiently long or the internal thru-passage is sufficiently narrow to constrain the user to position the camera substantially directly in front of the sight tube in order to see completely through the tube, thereby aligning the sight axis of the camera and squaring the camera/lens system 10 with the front face plane 114.

A bubble level (not shown) can be provided on the measurement device, and can be used in conjunction with a bubble level on the camera (also not shown) to facilitate the process of aligning the camera to the measurement device. While the measurement device can be supported on any flat, level surface, it should be apparent to one having skill in the art that the camera can also be supported on the same flat level surface or mounted a short distance away on a standard camera tripod. As proper alignment can be critical to accurate and repeatable measurements, it can be appreciated that accuracy and repeatability can be improved if the camera is mounted on a stationary object rather than held by hand during the measurement process, although the method of using a hand-held camera with the measurement device can still be considered to fall within the scope of the present invention.

To accurately map that the plane of focus is within image sensor's depth of field, it may be desirable to move the centerline sight axis of the camera relative to the position and orientation of the depth-of-field ruler. For this reason, a plurality of focusing targets, with front thru-holes concentric with a plurality of corresponding back thru-holes, can be located on the front face. In the embodiment 100 illustrated in FIGS. 2-13, five of the nine focusing targets 124 on the front face 122 have been provided with front thru-holes 128, and have been numbered A-E.

The number and placement of the thru-holes allows the camera position to be adjusted in both the vertical and horizontal directions. As can be seen, focusing targets A-C have common centerlines 118 that are raised above the pivot axis of the depth of field ruler by a distance d (see FIG. 10). The additional elevation can improve the view of the depth-of-field ruler, especially when the ruler is orientated in a relatively flat position. Focusing targets D and E, on the other hand, are aligned with the pivot axis of the depth of field ruler. Focusing target E, specifically, can allow for a captured close-up image of the ruler and focusing target that can provide greater detail for comparison and analysis. Focusing target E, for example, may be used in conjunction with the use of a telephoto lens having a relatively small viewing area to enable both the target and ruler to be viewed.

Figure 11:
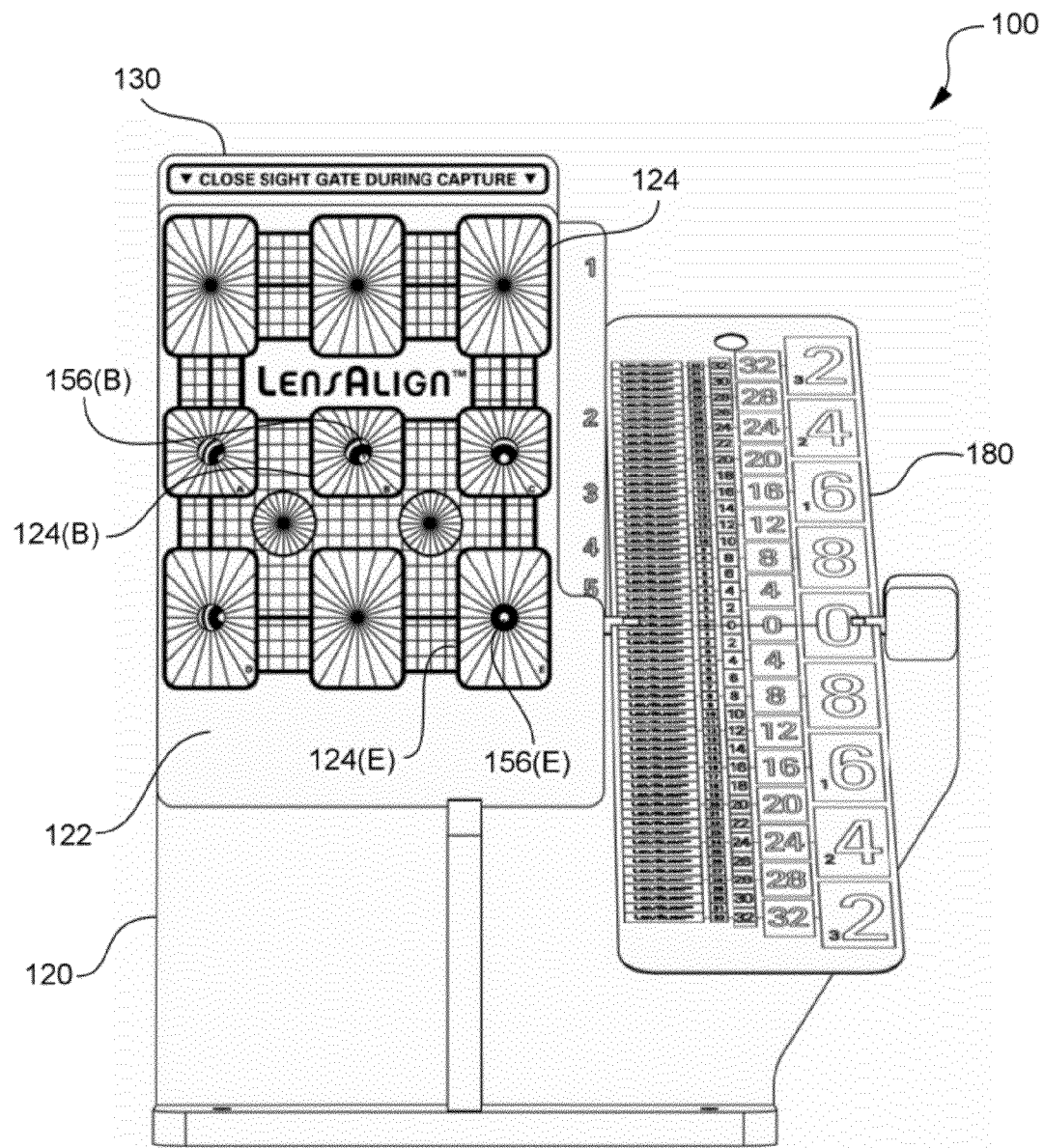
FIG. 11 is a front view of the measurement device as seen during final alignment, in accordance with the embodiment of FIG. 2.

Illustrated in FIG. 11 is one step in the method for aligning the camera to the measurement device 100 of the present invention. The camera can be positioned close enough to the front support plate 120 of measurement device so that the front face 122 and the depth-of-field ruler 180 substantially fill the frame of the picture. This distance can normally range from 12 to 24 inches, but as the proper framing of the image is highly dependent upon the lens coupled to the camera body, the distance between the camera lens and the front face could extend up to dozens or even hundreds of feet. A longer depth-of-focus ruler can be used to provide measurements when the depth-of-field is designed to be relatively wide or deep. Additionally, larger geometric symbols can be used to help calibrate the focus on long-range telephoto type lenses.

In FIG. 11, the measurement device 100 is seen as if from the viewfinder or LCD screen of the camera, which can be positioned in front of the measurement device in accordance with FIG. 10. The sliding shutter 130 can be raised into its open position, and it is clear that the focusing targets 124 located on the front face 122 of the front support plate 120 are in focus. Looking through the front thru-hole in the center focusing target B 124(B), one can see the high-contrast sighting target and a portion of the alignment dot 156(B) (or back thru-hole, depending on a configuration) in the lower right-hand corner. This indicates that the centerline sight axis of the camera is not aligned with the common centerline axis of the thru-hole in focusing target B. However, the centerline sight axis of the camera is aligned with the thru-hole in focusing target E 124(E), as the alignment dot 156(E) (or back thru-hole) is accurately centered near the middle of the front thru-hole. If focusing target E is the desired target, no additional adjustments to the positions of the camera or measurement device are needed. Once the relative position of the camera to the measurement device has been fixed or locked into place, the sliding shutter 130 can be moved to the closed position so that the auto-focus system of the camera is prevented from seeing, and possibly focusing on, the back support plate.

The accuracy-of-focus measurement device 100, as illustrated in FIGS. 2-11, can enable a user to focus his or her camera on the focusing targets 124 and quickly determine using the depth-of-field ruler 180 whether depth of field of a camera/lens system 10 is within a desired tolerance. The angle of the depth-of-field ruler can be quickly and easily changed to allow measurement of the depth-of-field of the camera/lens system at various angles to provide additional information. For example, a user may take digital photographs of the measurement device at angles of 5, 25, and 45 degrees relative to the horizontal sight axis of the camera. These photographs can then be displayed on a relatively large display screen and analyzed. The camera/lens system can then be adjusted, as previously discussed, to bring the depth of focus within a desired tolerance.

Figure 12:
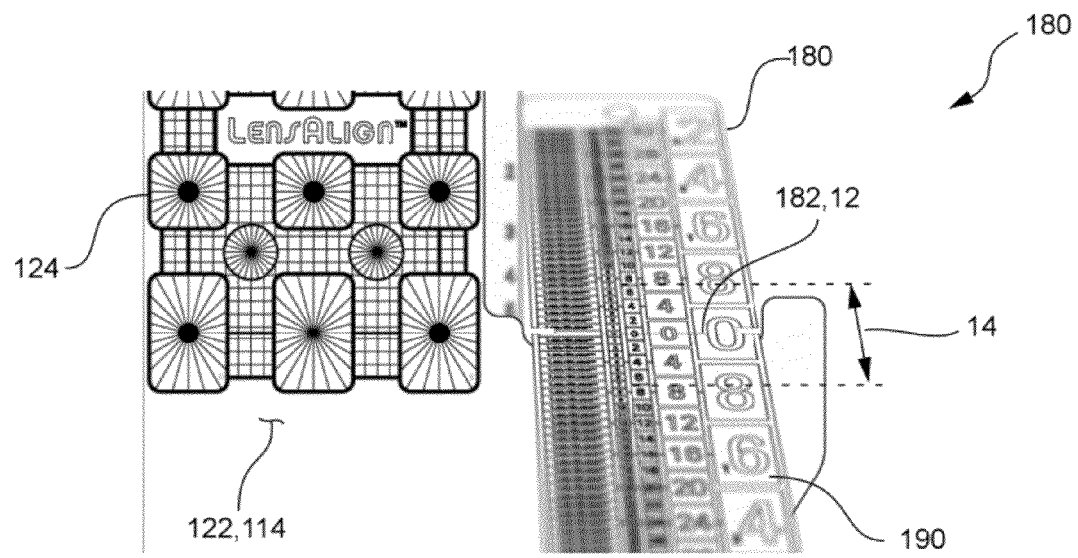
FIG. 12 is an illustration of a captured image of the aligned and in-focus measurement device with the depth-of-field ruler in a highly-angled position; in accordance with the embodiment of FIG. 2.
Figure 13:
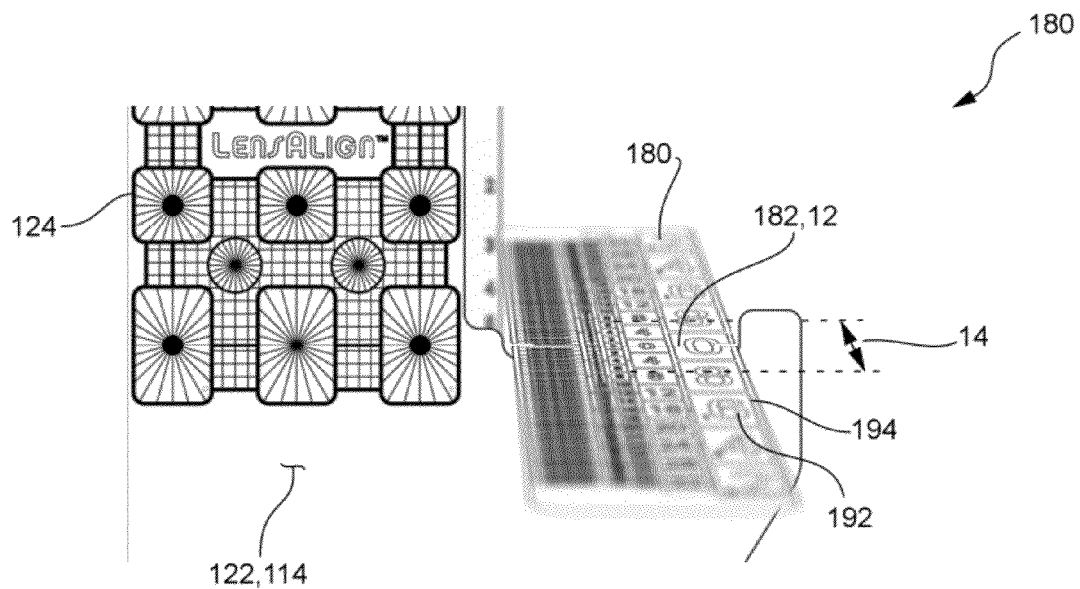
FIG. 13 is an illustration of a captured image of the aligned and in-focus measurement device with the depth-of-field ruler in a flattened position; in accordance with the embodiment of FIG. 2.

FIGS. 12 and 13 depict photographs which can result when the image of the measurement device has been captured with the camera's imaging sensor, and with the depth-of-field ruler in two different angular positions. As can be seen in FIG. 12, the focusing targets 124 located on the front face 122 of the measurement device are clearly in focus. The indicia 190 on the depth-of-field ruler 180 is in-focus near and around the transverse (or pivot) axis 182 that is aligned with the front face plane 114, while the indicia to either end of the ruler is blurred and out-of-focus.

The depth of field ruler 180 in FIG. 12 is positioned at an acute angle which is close to 45 degrees relative to the horizontal centerline sight axis of the camera. With the ruler in this orientation, it is apparent that the numeral "0" in largest series of indicia 190 (furthest to the right) is in focus, while outer edges of the numeral "8" to either side are somewhat blurry. Looking to the next-largest (or second) series of indicia ($2^{nd}$ from the left), it appears that both numerals "4" on either side of the transverse axis 182 are in focus, that both numerals "8" are beginning to lose their focus, and that both numerals "12" are out-of-focus. This would indicate that the forward and back borders of the depth of field 14 of the camera system (see FIG. 1) are located between the second series numerals "4" and "8", and that the plane of focus 12 (or 114) of the focusing sensor of the camera is centered within the depth of field 14. However, with the depth-of-field ruler positioned at such a steep angle, it is difficult to precisely define the boundaries of the depth of field 104.

The depth-of-field ruler 180 in FIG. 13 is positioned at an acute angle which is closer to horizontal with respect to the horizontal centerline sight axis of the camera (or 90 degrees relative to the vertical front face plane 114). Positioning the ruler in this orientation can allow for better accuracy in identifying the in-focus and out-of-focus portions of the ruler in the image, but simultaneously can make the edge-on numerals more difficult to read. Consequently, using indicia 190 that is a combination of numbers 192 and geometric shapes 194 can provide a distinct advantage over the prior art by allowing the user to count shapes to more-accurately identify locations when the ruler is in the flattened orientation.

For example, in FIG. 13 it appears that the boundary between the in-focus and out-of-focus regions on both sides of the ruler lies between the $3^{rd}$ and $4^{th}$ squares in the third series of indicia ($3^{rd}$ from left). Although it is too difficult to read the numbers associated with the 3rd square in FIG. 13, referring back to FIG. 12 allows the user to determine that this square corresponds with the numeral "6". Thus, by using two or more captured images with the depth-of-field ruler in different angular positions, improved accuracy can be achieved in identifying the boundaries of the depth of field 14 of the imaging sensor.

It is to be appreciated that the depth-of-field ruler 180 can provide a maximum depth-of-field view at an angle of 45 degrees and a minimum depth-of-field at an angle of closer to horizontal (or 0 degrees with respect to horizontal centerline sight axis of the camera). For example, a depth of field of a camera and lens system viewing the depth of field ruler at an angle of 5 degrees may be +/−1 inch, for a total depth of field of 2 inches. The same depth of field when viewing the ruler at an angle of approximately 45 degrees may be +/−1.4 inches, for a total depth of field of approximately 3 inches. Thus, a user may be able to make rough adjustments to the field of view of a camera/lens system with the ruler set at 45 degrees, and then reduce the angle of the camera and allow a narrower field of view to make more fine adjustments.

In one aspect of the invention, the markings or indicia 190 on the depth-of-field ruler 180 may be calibrated to be accurate at an angle of 22.5 degrees, half way between the minimum and maximum. Alternatively, another desired angle may be used to calibrate the markings on the ruler. Multiple depth-of-field rulers may be available that are calibrated for accurate measurement at different angles, such as 5 degrees, 22.5 degrees, and 45 degrees.

The exemplary embodiment of the accuracy-of-focus measurement device 100 empowers digital photographers to be in control of their camera, enabling them to adjust each camera/ lens combination without the need for expensive, expert assistance each time their camera and a selected lens are outside of a desired tolerance. This allows higher quality pictures to be taken, and helps to ensure that a camera/lens combination will be in focus for at critical moments for pictures that may not be able to be duplicated at a later time.

Figure 14:
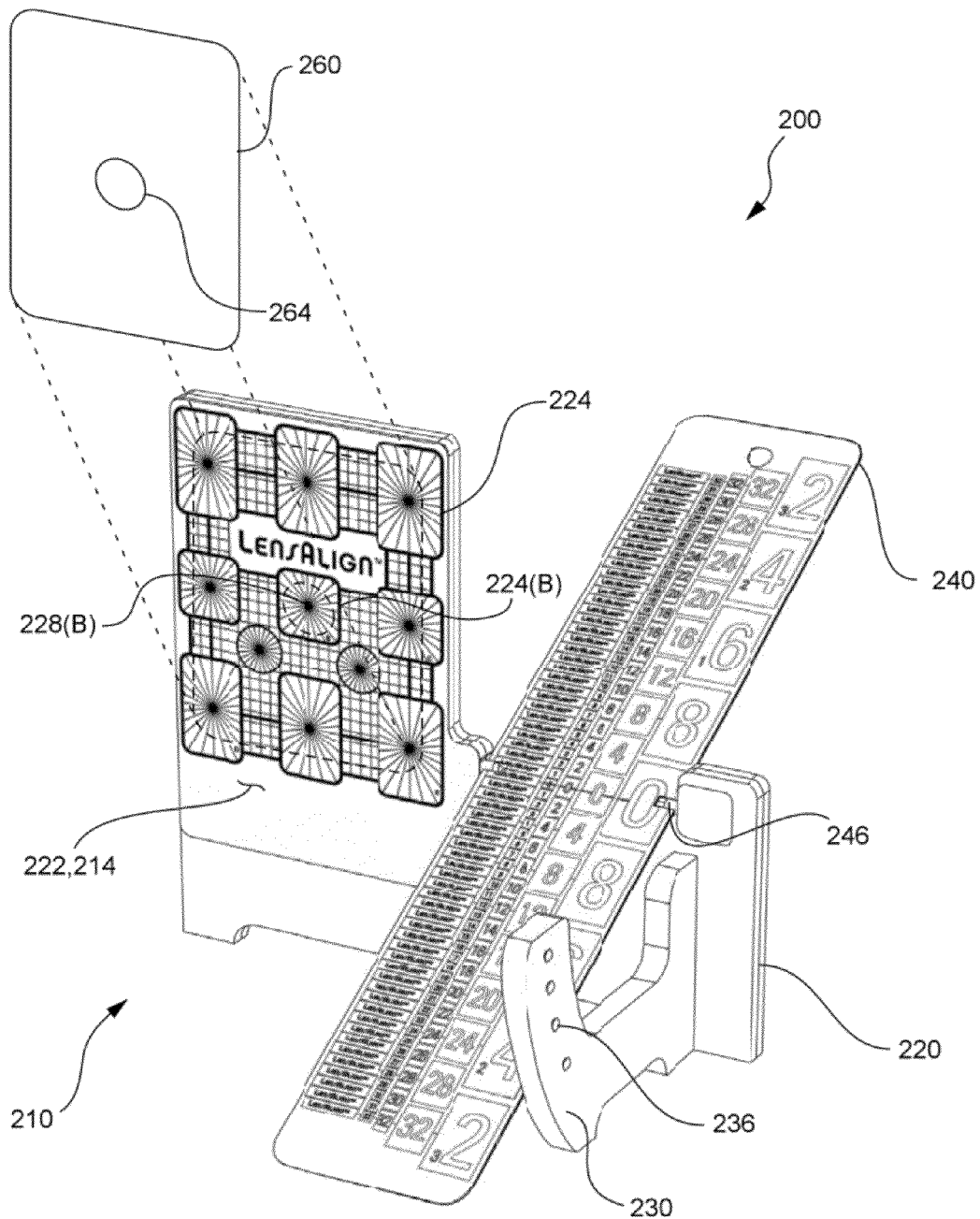
FIG. 14 is a front perspective view of an accuracy-of-focus measurement device, in accordance with another exemplary embodiment of the present invention.

It is to be appreciated that a number of variations of the accuracy-of-focus measurement device are also possible. For example, illustrated in FIG. 14 is another exemplary embodiment 200 of the present invention which can comprise a pivoting depth-of-field ruler 240 and a focusing target 224 which are supported on a 2-piece frame 210. The 2-piece frame 210 can be comprised of a target support section 220 and a forward-extending ruler support section 230. The focusing target 224 can be mounted on the front face 222 of the target support section 220 which defines the front face plane 214. The target support section and the ruler support section can be constructed to allow one of the sections to be inserted into the other section to form the free-standing accuracy-of-focus measurement device 200. The two sections may be formed of plastic, paper, metal, a composite of multiple materials, or another material capable of supporting the ruler 240 and focusing target 224.

After the accuracy of focus measurement device 200 has been assembled, a user can quickly attach and adjust a metallic depth-of-field ruler 240 to a pre-determined angular position by rotating the depth-of-field ruler on registering hinge support magnets 246 until a front portion of the ruler contacts one of a plurality of front ruler supports, which can be magnetic inserts 236 for magnetically holding and supporting the front section of a metallic depth-of-ruler in a pre-determined angular position.

The embodiment 200 may not have a back support plate which can be used to provide sighting targets or alignment thru-holes. Instead, to align the image sensor or film in the camera to be substantially square to the front face plane 214 and centered on the central target 224(B), a reflective mirror 260 with a center alignment designator 264 can be removably attached over the focusing target 224 during the alignment phase. The center alignment designator may be a thru-hole that enables the central target to be viewed. Alternatively, a mark near a center of the mirror may be used.

In one embodiment, the reflective mirror 260 may be magnetically attached over the focusing target 224. A single thru-hole 228(B) can be formed in the target support section to allow for rough alignment from behind the measurement device 200. After the measurement device and the camera have been roughly aligned, a user can sight through the camera's view finder (or using an electronic display showing the view of the view finder) and adjust the height and/or position of either the camera or the measurement device until the camera's lens is clearly reflected in the mirror 260 through the view finder. The ability to view the camera lens in the mirror 260 through the view finder indicates that the plane of the image sensor or film is substantially parallel with the plane of the focusing target 224.

Once the image sensor is substantially parallel with the focusing target 224, the position of the camera relative to the measurement device 200 can be adjusted such that a center of the camera lens is substantially centered with the center alignment designator 264, as viewed through the view finder. This indicates that the centerline sight axis of the camera is aligned with the central target 224(B) and that the image sensor is orientated substantially parallel and square with the front face plane 214. The mirror can be subsequently removed to allow the camera to be focused on the focusing target 224 for the image capture phases of the measurement process, as previously discussed. Without the ability to accurately align the camera/lens system with a particular location on the focusing target, repeated measurements (i.e. pictures) taken of the measurement device can yield slightly different results due to potential chromatic aberrations in the camera lens. Thus, the ability to square the camera/lens system with the measurement device and align the camera/lens system with the central target enables substantially accurate, repeatable measurements of the camera/lens system's depth of focus to be acquired, thereby assisting in accurate correction of the depth of focus in the camera/lens system.

Figure 15:
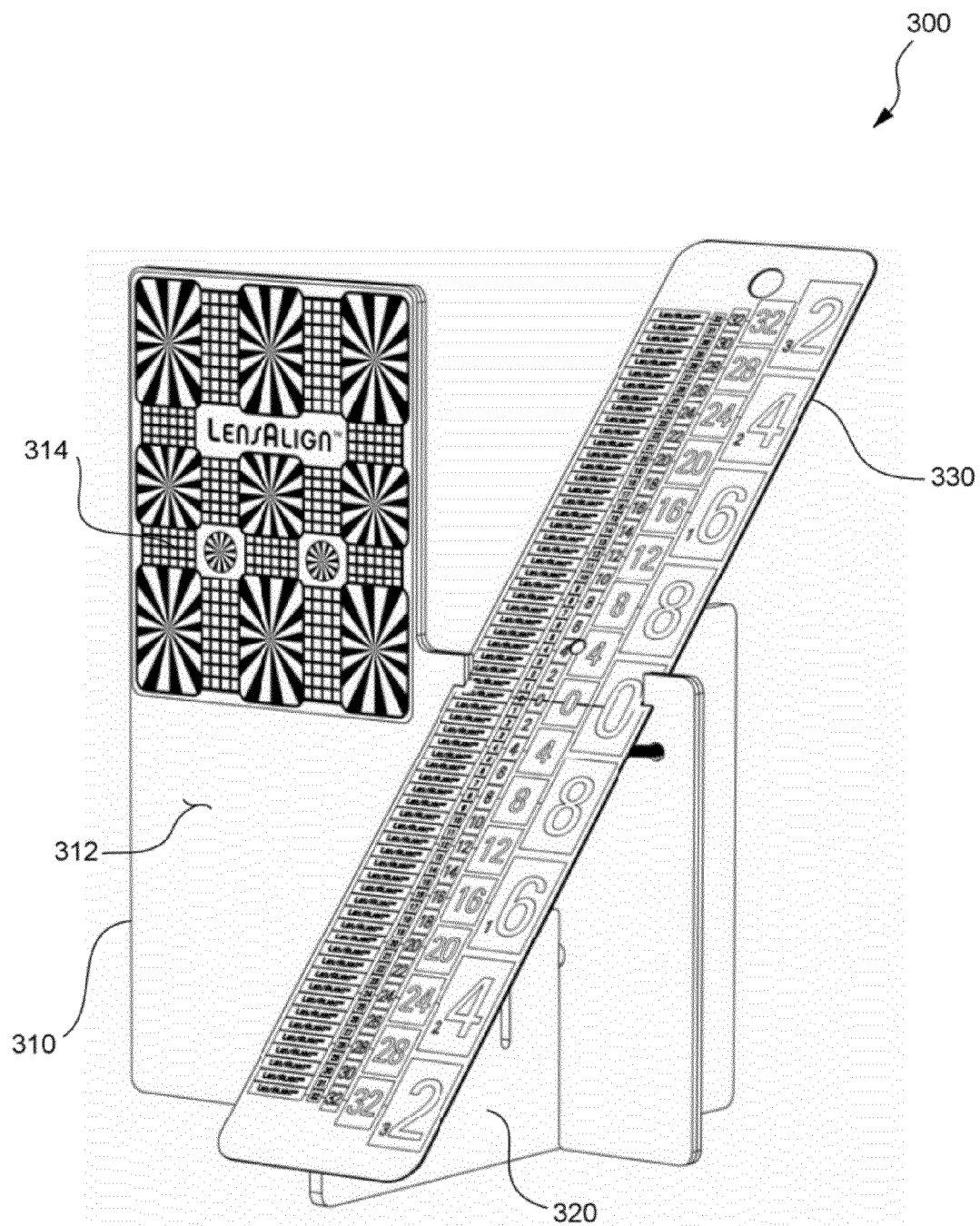
FIG. 15 is a front perspective view of an accuracy-of-focus measurement device, in accordance with another exemplary embodiment of the present invention.
Figure 16:
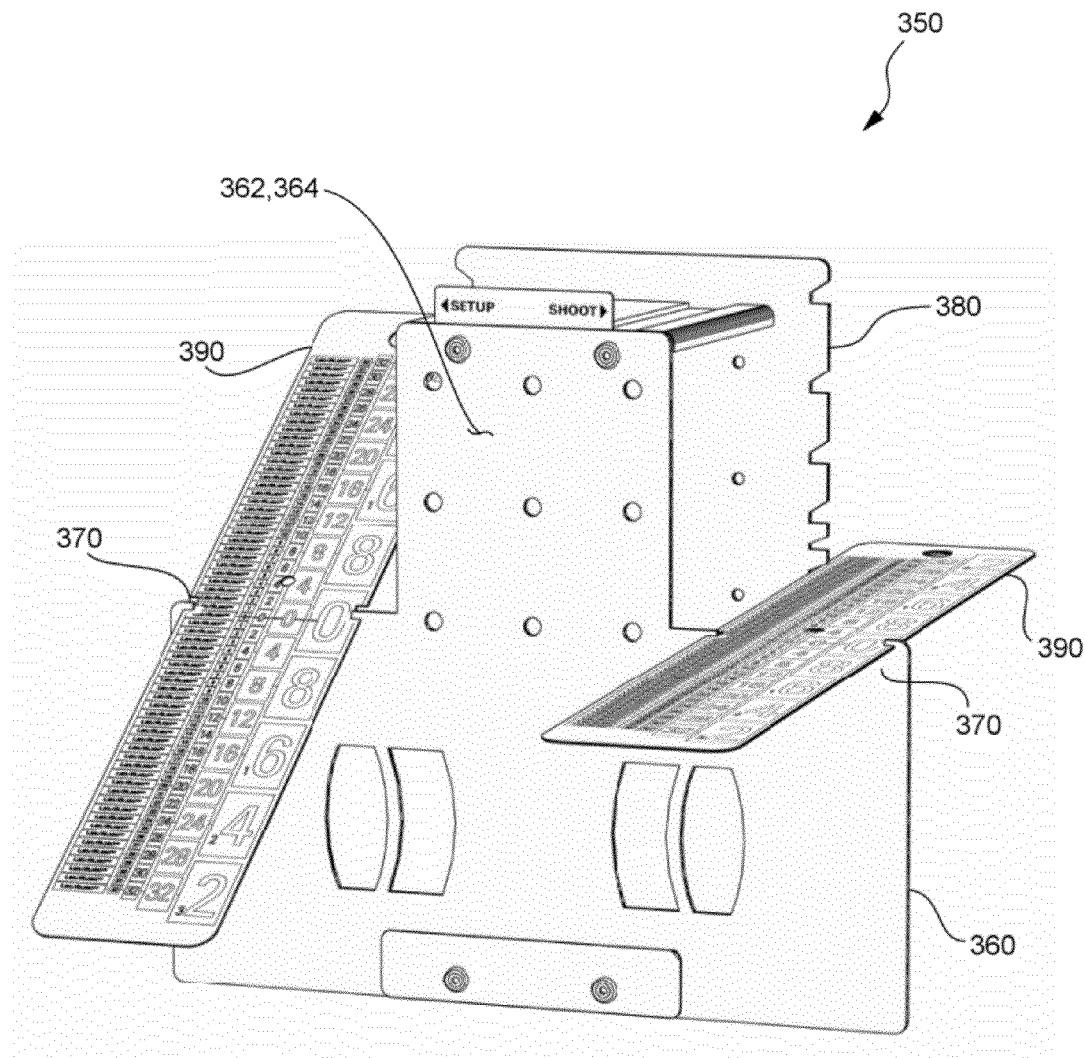
FIG. 16 is a front perspective view of an accuracy-of-focus measurement device, in accordance with yet another exemplary embodiment of the present invention.

Illustrated in FIG. 15 is another exemplary embodiment 300 which comprises a single, slidable depth-of-field ruler 330 and a focusing target 314 which are supported on a 2-piece frame 310 comprising a target support section 312 and a ruler support section 320. The focusing target 314 can be mounted on the front face 212 of the target support plate. The target support section and the ruler support section can be constructed to allow one of the sections to be inserted into the other section to form the free standing accuracy-of-focus measurement device 300. As described above, the two sections may be formed of plastic, paper, metal, a composite of multiple materials, or another material capable of supporting the ruler 330 and focusing target 314. Once the accuracy of focus measurement device 300 has been assembled, a user can adjust an angle of the depth-of-field ruler 330 to a predetermined angle by sliding the ruler support section 320 with respect to the target support section 310.

The ruler support section 320 can include a plurality of metallic inserts or studs that can be constructed of material such as steel, stainless steel, iron, nickel, and the like. The target support section 310 can include a ruler position magnet. As the ruler support section is directed orthogonal to the target support section, the metallic inserts can line up with the ruler position magnet. The metallic inserts can be positioned within the ruler support section at locations that allow the position of the target support section to be adjusted to direct the ruler 330 at a desired angle with respect to the surface on which the measurement device 300 is placed. A user can quickly adjust the ruler from one preset angle to a different preset angle by sliding the ruler support section forward or backward with respect to the focal target section until one of the metallic inserts for studs magnetically engages with the ruler position magnet.

The target section 310, the ruler support section 320, and the depth-of-field ruler 330 can be stored flat in a carrying case, such as a pocket of a camera system. The three pieces can be quickly removed from the carrying case and assembled to form the accuracy-of-focus measurement device 300.

The accuracy-of-focus measurement device of the present invention can also be configured to include two or more depth-of-field rulers. For example, the exemplary embodiment 350 illustrated in FIG. 15 can comprise a front plate 360, a back plate 380 and two depth-of-field rulers 390. In addition to providing the front face 362 for focusing and thru-holes for a sighting and alignment system, the front plate 360 can also include two ruler cradles 370 extending from either side of the front face 362 and in-line with a front face plane 364. The two depth-of-field rulers 390 can be pivotable supported on the two ruler cradles 370, and which can be orientated at dissimilar angles so as to incorporate the benefits of both the steep ruler and shallow ruler configurations into a single captured measurement image. Thus, by simultaneously comparing the images of the two depth-of-field rulers positioned at different angles, one is able to accurately analyze the position of the focusing plane of the focusing sensor within the depth-of-field of the camera/lens system in the same photograph.

There may be some variation in opinion as to which set of angles at which the depth-of-field ruler is set provides the most pertinent information for a particular camera/lens configuration, such as which set of angles may be preferable for a particular wide-angle, standard, or telephoto lens system. However, it is clear that a measurement device which allows for simultaneous adjustment of the angles of two depth-of-field rulers over a wide range of angles, including a flat ruler option, has a distinct advantage over the prior art that is fixed at a 45 degree angle relative to the camera and lens system.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed is:

1. An accuracy-of-focus measurement device for measuring a depth-of-field of a camera having a first light path between a primary lens and a focusing sensor and second light path between the primary lens and an image sensor, the measurement device comprising:
    a frame having a substantially planar front face with a focusing target located thereon;
    a sighting device operatively coupled to the frame and configured to enable a plane of the image sensor of the camera to be aligned substantially parallel with the front face plane,
    at least one depth-of-field ruler coupled to the frame and having a transverse axis falling within a front face plane and a longitudinal axis that is angularly adjustable with respect to the front face plane.

2. The measurement device of claim 1, wherein the transverse axis further comprises a pivot line about which the depth-of-field ruler pivots to adjust its angular position with respect to the front face plane.

3. The measurement device of claim 2, further comprising the depth-of-field ruler having at least one notch formed at the pivot line for coupling against a registering surface of the frame, to align the pivot line within the front face plane.

4. The measurement device of claim 3, wherein the registering surface is magnetic.

5. The measurement device of claim 1, wherein the transverse axis of the depth-of-field ruler is positioned below a centerline sight axis of the camera system.

6. The measurement device of claim 1, wherein the at least one depth-of-field ruler further comprises a repeating pattern of at least two sets of proportionately sized geometric shapes marked thereon, wherein the size of one of the at least two sets of geometric shapes is divisible by an integer from the other of the at least two sets of geometric shapes.

7. The measurement device of claim 1, wherein the frame further comprises:
    a front plate providing the front face and having a plurality of front thru-holes formed therein;
    a back plate having a plurality of sighting targets formed thereon, wherein the sighting targets are visible through the front thru-holes when the plane of the image sensor of the camera is aligned to and substantially parallel with the front face plane; and
    a supporting base for supporting the back plate parallel with and a pre-determined distance behind the front plate.

8. The measurement device of claim 7, further comprising a shutter device coupled to the front plate and configured to uncover the plurality of front thru-holes during an alignment phase and to cover the front thru-holes during a depth-of-field measurement phase.

9. The measurement device of claim 7, wherein the sighting targets formed in the back plate further comprise back thru-holes concentric with the front thru-holes, to provide a line-of-sight through the measurement device to facilitate alignment of the measurement device with the image sensor of the camera.

10. The measurement device of claim 8, further comprising the front plane plate having at least one cradle for pivotably supporting the depth-of-field ruler thereon, and the back plate having support means for supporting the depth-of-field ruler in a plurality of pre-determined angular positions.

11. The measurement device of claim 10, wherein depth-of-field ruler further comprises a metallic material, and wherein the back plate support means further comprises magnetic inserts for supporting the metallic depth-of-field ruler in a plurality of pre-determined angular positions.

12. An accuracy-of-focus measurement system for measuring a depth-of-field of a camera, the system comprising:

a measurement device configured to operate with a camera having a first light path between a primary lens and a focusing sensor and second light path between the primary lens and an image sensor, the measurement device comprising:

a frame having a substantially planar front face with a focusing target located thereon;

a sighting device operatively coupled to the frame and configured to facilitate alignment of a plane of the image sensor of the camera substantially parallel with a front face plane; and at least one depth-of-field ruler coupled to the frame and having longitudinal axis that is at an angle with respect to the front face plane; and wherein at least one of the camera and the measurement device can be moved in space to align the plane of the image sensor of the camera substantially parallel with the front face plane.

13. A method for measuring a depth-of-field of a camera having a first light path between a primary lens and a focusing sensor and second light path between the primary lens and an image sensor, the method comprising:

obtaining a measurement device having a substantially planar front face with a focusing target located thereon and a sighting device configured to facilitate alignment of a plane of the image sensor of the camera substantially parallel with a plane of the front face, and at least one depth-of-field ruler having a longitudinal axis that is at an angle with respect to the front face plane;

aligning a plane of the image sensor of the camera substantially parallel with the front face plane using the sighting device;

focusing the camera on the focusing target;

recording an image of the focusing target and the depth-of-field ruler; and reviewing the image to determine a center position and width of the depth-of field of the camera on the depth-of-field ruler.

14. The method of claim 13, wherein obtaining the measurement device further comprises the measurement device having the at least one depth-of-field ruler having a longitudinal axis that is angularly adjustable with respect to the front face plane.

15. The method of claim 13, further comprising providing a sighting device comprising a mirror having a center alignment designator, wherein the mirror is configured to be mounted on the focusing target to facilitate alignment of the plane of the image sensor of the camera to be substantially parallel with the front face plane by aligning at least one of the camera and the focusing target until a lens of the camera is viewable in the mirror through the camera's view finder and the lens is substantially centered with the center alignment designator.

16. The method of claim 13, wherein obtaining a measurement device further comprises:

obtaining a front supporting plate providing the front face and having a plurality of front thru-holes formed therein;

obtaining a back supporting plate having a plurality of sighting targets formed thereon, wherein the sighting targets are visible through the front thru-holes when the plane of the image sensor of the camera is aligned to and substantially parallel with the front face plane; and assembling the front and back plates into a supporting base configured to support the back plate parallel with and a pre-determined distance behind the front plate.

17. The method of claim 16, further comprising a shutter device coupled to the front plate and configured to uncover the plurality of front thru-holes during an alignment phase and to cover the front thru-holes during a depth-of-field measurement phase.

18. The method of claim 16, wherein aligning the plane of the image sensor substantially parallel with the front face plane further comprises sighting with the image sensor through the front thru-holes to the sighting targets to align the camera with the measurement device.

19. The method of claim 17, wherein focusing the camera on the focusing target further comprises closing the shutter device to prevent focusing on the sighting targets.

20. The method of claim 16, wherein the plurality of sighting targets further comprises back thru-holes concentric with the front thru-holes, to provide a line-of-sight through the measurement device to facilitate alignment of the measurement device with the image sensor of the camera.

21. The method of claim 20, wherein aligning the plane of the image sensor of substantially parallel with the front face plane further comprises sighting from the back of the measurement device, through the front and back thru-holes, to the camera to roughly align in the measurement device to the camera.

22. The method of claim 21, wherein sighting from the back of the measurement device further comprises placing a mirror over the primary lens to reflect an image of the measurement device back through the front and back thru-holes.

23. The system of claim 12, wherein the at least one depth-of-field ruler has a longitudinal axis that is angularly adjustable with respect to the front face plane.

24. The system of claim 12, wherein the sighting device further comprises:

a front plate providing the front face and having an at least one front thru-hole formed therein;

a back plate having an at least one sighting target formed thereon, wherein the at least one sighting target is visible through the at least one front thru-holes when the plane of the image sensor of the camera is aligned to and substantially parallel with the front face plane; and a supporting base for supporting the back plate parallel with and a pre-determined distance behind the front plate.

25. The method of claim 14, further comprising:

adjusting an angle of the depth-of-field ruler;

recording a second image of the focusing target and the depth-of-field ruler; and contrasting the second image with the first image to determine a center position and width of the depth-of field of the camera on the depth-of-field ruler.

26. The method of claim 13, further comprising providing the sighting device comprising:
- a front supporting plate providing the front face and having a plurality of front thru-holes formed therein; and
- a back supporting plate having a plurality of sighting targets formed thereon, wherein the back supporting plate is positioned a selected distance behind the front supporting plate such that the sighting targets are visible through the front thru-holes from the camera when the plane of the image sensor of the camera is substantially aligned to and substantially parallel with the plane of the front face.

27. An accuracy-of-focus measurement device for measuring a depth-of-field of a camera having a first light path between a primary lens and a focusing sensor and second light path between the primary lens and an image sensor, the measurement device comprising:
- a frame having a substantially planar front face with a focusing target located thereon; and
- at least one depth-of-field ruler coupled to the frame and having a transverse axis falling within a front face plane and a longitudinal axis that is angularly adjustable with respect to the front face plane, wherein the at least one depth-of-field ruler further comprises a repeating pattern of at least two sets of proportionately sized geometric shapes marked thereon, wherein the size of one of the at least two sets of geometric shapes is divisible by an integer from the other of the at least two sets of geometric shapes.

* * * * *